(12) United States Patent
Nielsen et al.

(10) Patent No.: US 12,078,467 B2
(45) Date of Patent: Sep. 3, 2024

(54) COMMERCIAL BLASTING SYSTEMS

(71) Applicant: Orica International Pte Ltd, Singapore (SG)

(72) Inventors: Kresten Lukas Coffey Nielsen, Newcastle (AU); Kieren Peter Rasmussen, Kurri Kurri (AU); Johann Zank, Valentine (AU); Richard John Goodridge, Redhead (AU)

(73) Assignee: Orica International Pte Ltd, Singapore (SG)

( * ) Notice: Subject to any disclaimer, the term of this patent is extended or adjusted under 35 U.S.C. 154(b) by 306 days.

(21) Appl. No.: 17/622,172

(22) PCT Filed: Jun. 26, 2020

(86) PCT No.: PCT/SG2020/050370
§ 371 (c)(1),
(2) Date: Dec. 22, 2021

(87) PCT Pub. No.: WO2020/263193
PCT Pub. Date: Dec. 30, 2020

(65) Prior Publication Data
US 2022/0349693 A1 Nov. 3, 2022

(30) Foreign Application Priority Data

Jun. 27, 2019 (SG) .............................. 10201905973Y

(51) Int. Cl.
*H04W 4/38* (2018.01)
*F42D 1/04* (2006.01)
(Continued)

(52) U.S. Cl.
CPC ................. *F42D 3/04* (2013.01); *F42D 1/04* (2013.01); *H04W 4/38* (2018.02); *B64U 2101/00* (2023.01)

(58) Field of Classification Search
CPC ......... F42D 3/04; H04W 4/38; B64U 2102/00
(Continued)

(56) References Cited

U.S. PATENT DOCUMENTS

| 6,253,679 | B1 * | 7/2001 | Woodall ................ F42C 13/047 102/221 |
| 6,422,145 | B1 * | 7/2002 | Gavrilovic ............ F42C 13/047 102/202.1 |

(Continued)

FOREIGN PATENT DOCUMENTS

| AU | 2012101113 A4 | 8/2012 |
| CA | 2943777 A1 | 10/2015 |

(Continued)

OTHER PUBLICATIONS

PCT/SG2020/050370, International Preliminary Report on Patentability dated Dec. 28, 2021, 6 pages.
(Continued)

*Primary Examiner* — April G Gonzales

(57) ABSTRACT

Disclosed is a system for assisting blasting. The system includes at least one wireless blasting-related device that is deployable or deployed proximate to or within a portion of physical media intended to be blasted as part of a commercial blasting operation. The blasting-related device includes a device-based magnetic induction (MI) signal receiver with a magnetometer configured for through the earth (TTE) MI communication, and the blasting-related device includes a device-based MI signal source with a device-based antenna configured for TTE MI communication. The device-based MI signal source is configured to communicate with a vehicle-based MI signal receiver in a blast support vehicle that includes a set of vehicle-based magnetometers.

15 Claims, 14 Drawing Sheets

(51) Int. Cl.
*F42D 3/04* (2006.01)
*B64U 101/00* (2023.01)

(58) Field of Classification Search
USPC .......................................................... 455/40
See application file for complete search history.

(56) References Cited

U.S. PATENT DOCUMENTS

| | | | | |
|---|---|---|---|---|
| 7,568,429 | B2 * | 8/2009 | Hummel | F42D 1/055 |
| | | | | 102/206 |
| 7,929,270 | B2 * | 4/2011 | Hummel | F42D 3/04 |
| | | | | 361/249 |
| 8,886,117 | B1 * | 11/2014 | Hong | H04B 13/02 |
| | | | | 343/788 |
| 9,181,790 | B2 * | 11/2015 | Mace | F42D 3/06 |
| 9,835,428 | B2 * | 12/2017 | Mace | F42B 3/113 |
| 11,119,243 | B2 * | 9/2021 | De Barros Braga | G01V 3/12 |
| 11,585,643 | B2 * | 2/2023 | Johnson | F42B 3/113 |
| 2004/0102219 | A1 * | 5/2004 | Bunton | H04B 5/48 |
| | | | | 455/39 |
| 2010/0311325 | A1 * | 12/2010 | Marshall | H04B 13/02 |
| | | | | 505/211 |
| 2012/0174809 | A1 * | 7/2012 | Stewart | F42D 1/055 |
| | | | | 102/215 |
| 2017/0074625 | A1 * | 3/2017 | Appleby | F42B 3/113 |
| 2018/0299240 | A1 * | 10/2018 | Van Wyk | F42D 1/055 |

FOREIGN PATENT DOCUMENTS

| | | |
|---|---|---|
| CN | 107576234 A | 1/2018 |
| WO | WO-2012061850 A1 | 5/2012 |
| WO | WO-2015143500 A1 | 10/2015 |
| WO | WO-2015143501 A1 | 10/2015 |
| WO | WO-2017083885 A1 | 5/2017 |
| WO | WO-2020263193 A1 | 12/2020 |

OTHER PUBLICATIONS

PCT/SG2020/050370, International Search Report and Written Opinion mailed Aug. 28, 2020, 10 pages.

Yenchek, et al., "NIOSH-Sponsored Research in Through-the-Earth Communications for Mines: A Status Report," IEEE Transactions on Industry Applications, Sep.-Oct. 2012, vol. 48, No. 5, pp. 1700-1707.

* cited by examiner

COMMERCIAL BLASTING SYSTEMS

RELATED APPLICATION

The present application is related to and claims the priority benefit of Singaporean Provisional Patent Application No. 10201905973Y filed on 27 Jun. 2019 in the name of Orica International Pte Ltd, the originally filed specification of which is hereby incorporated by reference herein in its entirety.

TECHNICAL FIELD

Aspects of the present disclosure relate to systems and methods for assisting commercial blasting based on blasting-related devices that are deployable or deployed within portions of a physical medium (e.g., a rock formation) intended to be blasted as part of a commercial blasting operation. Such blasting-related devices include initiation devices (e.g., detonators) positioned in boreholes or blastholes.

BACKGROUND

Wireless initiation systems that communicate by way of magnetic induction (MI) signals, e.g., including WebGen™ wireless initiation devices produced by Orica International Pte Ltd., have recently been developed and used in commercial blasting operations such as underground mining and open cut mining. Such wireless initiation devices can greatly improve blasting safety, and have given rise to new blasting techniques not previously feasible with conventional wire-based initiation devices. WebGen™ wireless initiation devices are configured for reliable unidirectional or 1-way MI based communication over significant, long, or very long distances, e.g., greater than 100 meters, or several to many hundreds of meters (e.g., 100-900 meters), or possibly distances approaching or on the order of a kilometre.

However, the information available from and about these MI communication systems, e.g., to provide feedback on the state of components in the system, might be insufficient for some applications and some users.

It is desired to address or ameliorate one or more disadvantages or limitations associated with the prior art, or to at least provide a useful alternative.

SUMMARY

Described herein is a system for assisting blasting, the system including:
  at least one wireless blasting-related device that is deployable or deployed proximate to or within a portion of physical media intended to be blasted as part of a commercial blasting operation, wherein the blasting-related device includes a device-based magnetic induction (MI) signal receiver with a magnetometer configured for through the earth (TTE) MI communication, and the blasting-related device includes a device-based MI signal source with a device-based antenna configured for TTE MI communication,
  wherein the device-based MI signal source is configured to communicate with a vehicle-based MI signal receiver in a blast support vehicle that includes a set of vehicle-based magnetometers.
The system can include the blast support vehicle.
The device-based MI signal source configured for transition region or zone signal MI communication that is TTE. The wireless blasting-related devices are deployable or deployed in the physical media.

"Through the earth" (TTE) includes or refers to the communication of signals in, through and/or across a set of physical media residing between the signal source and the signal receiver or detector, e.g., wherein at least one of the signal source and the signal detector is at least partially obstructed, overlaid, covered, surrounded, buried, enclosed, or encased by the set of physical media. The set of physical media can include one or more of rock, broken rock, stone, rubble, debris, gravel, cement, concrete, stemming material, soil, dirt, sand, clay, mud, sediment, snow, ice, one or more hydrocarbon fuel reservoirs, site infrastructure, building/construction materials, and/or other media or materials. The physical media can be referred to as "the earth", where "earth" includes the ground, soil, a rock formation, rock, construction material/concrete, stone, borehole stemming, ice, frozen ground, etc.

The near-field signal MI communication can provide downlink MI communication including downlink MI signals to the wireless blasting-related devices. For the near-field signal MI communication, the device-based MI signal receiver is located within a near-field region or zone of a magnetic field generated by a vehicle-based or broadcast MI signal source, wherein magnetic field strength as a function of distance away from the vehicle-based or broadcast MI signal source decays in accordance with an inverse distance cubed relationship, and the device-based MI signal source detects changes in near-field magnetic flux generated by the vehicle-based or broadcast MI signal source rather than detecting far-field or radiatively propagated electromagnetic waves (e.g., radio waves) generated by the vehicle-based or broadcast MI signal source.

The transition region or zone signal MI communication can provide uplink MI communication including uplink MI signals from the wireless blasting-related devices. For the transition region or zone signal MI communication, the vehicle-based MI signal receiver can be positioned beyond the near-field region or zone of the magnetic field generated by the device-based MI signal source, but within approximately one-half of a wavelength away from the device-based MI signal source, and more commonly or particularly resides within approximately 10 skin depths (e.g., less than 10 skin depths), approximately 6 to 8 skin depths (e.g., less than 8 skin depths), approximately 3 to 5 skin depths (e.g., less than 5 skin depths), or approximately 2 to 4 skin depths (e.g., less than 4 skin depths) away from the device-based MI signal source.

The device-based antenna can include a set of electrically conductive coil or loop antennas. The device-based coil or loop antenna can have an average diameter of between 0.01 m and 0.3 m, which can corresponding to a diameter of the borehole. The device-based antenna can be driven at substantially or approximately 3 watts (W). The device-based coil or loop antenna can include a set of coil antennas.

The blasting-related devices are configured to generate, output and transmit the uplink MI signals. The uplink MI signals travel an uplink distance TTE using one or more uplink MI signal frequencies. The uplink distance can be less than 100 meters ("m"); less than 80 m; less than 60 m; between 0.10 m and 60 m; between 0.25 m and 50 m; between 0.50 m and 40 m; or between 1 and 30 m. The uplink MI signal frequencies can include at least one frequency in the low frequency (LF) ITU frequency band, and/or frequencies between 100 Hz to 100 MHz, between 1 kHz and 100 MHz, between 10 kHz and 300 kHz, or between 20 kHz and 200 kHz, or between 35 kHz and 130 kHz, or between 50 kHz and 100 kHz.

The blasting-related devices are configured to receive, decode and process the downlink MI signals. The downlink MI signals can travel a downlink distance TTE using one or more downlink MI signal frequencies, which can include broadcast MI signal frequencies. The broadcast MI signal frequencies can include substantially 2 kHz, or between 100 Hz and 10 kHz, or between 100 Hz and 100 kHz. The broadcast downlink distance can be greater than 100 meters; greater than multiple or many hundreds of meters; between 200 and 900 meters; greater than a kilometre; or greater than multiple kilometres. The broadcast downlink MI signal frequencies can include at least one frequency within the ultra low frequency (ULF) band, or within the very low frequency (VLF) band as defined by the International Telecommunications Union (ITU).

The blasting-related device can be configured for sending magnetic induction (MI) signals to and receiving MI signals from the vehicle thus providing bidirectional or 2-way MI-based communication with the vehicle.

The blasting-related device includes a device-based MI based communication unit. The device-based MI based communication unit is configured for the TTE MI based communication. The device-based MI based communication unit includes the device-based MI signal receiver that includes the set of device-based magnetometers (for bidirectional and unidirectional communication). The device-based MI based communication unit can include the device-based MI signal source that includes the set of coil or loop antennas for bidirectional communication. The device-based magnetometers can be 3-axis magnetometers configured for detecting magnetic flux in 3 mutually orthogonal axes. Alternatively, the device-based magnetometers can be single axis (1-axis) magnetometers configured for detecting magnetic flux in 1 orthogonal axis. The single axis (1-axis) magnetometer can be aligned in the blasting-related device for detecting magnetic flux parallel to the lengthwise, longitudinal, or central axis of the blasting-related device. Alternatively, the single axis (1-axis) magnetometer can be aligned in the blasting-related device for detecting magnetic flux perpendicular to the lengthwise, longitudinal, or central axis of the blasting-related device. The device-based magnetometers can include a coil or loop antenna (referred to as a "receive loop") with an average diameter of between 0.01 m and 0.3 m, which can corresponding to a diameter of the borehole.

The blasting-related device can be configured for deployment in a confined space proximate to or in the portion of the physical media. The blasting-related device has a geometry (including shape and size) configured for deployment in the confined space. The confined space can be a borehole, and the geometry can include: a perpendicular width (e.g., diameter for a circular cross section) that is less that a borehole diameter (open diameter of the borehole); and a (longitudinal) length that can be limited by (i) loading manner and optionally (ii) other borehole contents. The device-based MI signal source is configured based on the size of the blasting-related device. The device-based MI signal receiver is configured based on the size of the blasting-related device. The blasting-related device has an electrical charge storage capacity associated with the size: for example, the blasting-related device can be sized to fit into conventional boreholes, e.g., having an average diameter of substantially 4 to 6 cm (for a smaller embodiment) or substantially 10 to 20 cm (for a larger embodiment), and the power storage can be substantially equivalent to two or four commercially available "AA" size batteries (each of which can have substantially 1000 to 4000 milliampere hours capacity, e.g., substantially 3500 mAh for a lithium AA battery).

The blasting-related devices can include:
one or more initiation devices (i.e., wireless initiation devices);
one or more survey devices (i.e., wireless MI signal survey devices); and/or
one or more markers (i.e., wireless blast monitoring-and-tracking devices).

The vehicle-based magnetometers can be 3-axis magnetometers configured for detecting magnetic flux in 3 mutually orthogonal axes. Alternatively, the vehicle-based magnetometers can be a single axis magnetometer configured for detecting magnetic flux in 1 orthogonal axis. The vehicle-based single axis magnetometer can be aligned in the vehicle for detecting magnetic flux parallel to the lengthwise, longitudinal, or central axis of the blasting-related device when deployed. Alternatively, the vehicle-based single axis magnetometer can be aligned in the blasting-related device for detecting magnetic flux perpendicular to the lengthwise, longitudinal, or central axis of the blasting-related device when deployed. The vehicle-based magnetometer can include a coil or loop antenna (referred to as a "receive loop") with an average diameter of between 0.01 m and 2 m; and the smaller loops may be coils on a ferrite core.

The device-based MI signal source can be aligned in the blasting-related device for generating a magnetic flux maximum parallel to the lengthwise, longitudinal, or central axis of the blasting-related device when deployed in a borehole. Alternatively, the device-based MI signal source can be aligned in the blasting-related device for generating a magnetic flux maximum perpendicular to the lengthwise, longitudinal, or central axis of the blasting-related device when deployed in a boreholes.

Described herein is a system for assisting blasting, the system including:
at least one blast support vehicle configured for sending downlink magnetic induction (MI) signals to and/or receiving uplink MI signals from one or more wireless blasting-related devices that are deployable or deployed proximate to or within a portion of a physical media intended to be blasted as part of a commercial blasting operation.

The vehicle can be configured for airborne and/or land based travel. The vehicle can include or be an airborne automated and/or autonomous vehicle (e.g., a remotely piloted aircraft (RPA) and/or autonomous airborne drone). The vehicle can include or be a land based automated and/or autonomous vehicle (e.g., a remotely piloted terrestrial rover (RPTR) and/or autonomous land based drone).

The vehicle can include manual controls for a human occupant. The vehicle can include a remote-control unit for remote control of the vehicle. The vehicle can include an autonomous control unit for autonomous control of the vehicle.

The vehicle includes frame or body that carries a power or energy source, and locomotion elements. The vehicle includes a prime mover, motor or engine. The vehicle is configured for locomotion (i.e., the ability to move from one place to another) such that it can be selectively/selectably deployed, positioned, directed, guided, manoeuvred, piloted, and/or driven to multiple physical locations as part of supporting or facilitating a commercial blasting operation.

The vehicle includes an MI based communication unit configured for configured for sub-surface TTE MI based communication. The MI based communication unit can include (for the downlink MI communication) the vehicle-based MI signal source for sending the downlink magnetic induction (MI) signals (including generating, outputting and transmitting the downlink MI signals) to the blasting-related devices.

The MI based communication unit can include (for the uplink MI communication) the vehicle-based MI signal receiver for receiving the (uplink) MI signals (including receiving, decoding and processing the uplink MI signals) from the blasting-related devices (thus providing bidirectional MI based communication).

The MI signal source includes a vehicle-based antenna. The vehicle-based antenna can be a coil or loop antenna. The coil or loop antenna can have an average diameter greater than a meter or multiple meters; or greater than multiple tens of meters. The vehicle-based antenna can be driven at approximately or substantially 50 Watts (W). The coil or loop antenna can include a set of coil antennas. The vehicle-based MI source can be configured to generate a magnetic field distribution having a maximum magnetic field intensity aligned parallel or perpendicular to a lengthwise, longitudinal, or central axis of the one or more blasting-related devices when deployed in their boreholes. The vehicle-based MI signal source can drive the vehicle-based antenna at one or more vehicle-based downlink MI signal frequencies, which can include at least one frequency in the low frequency (LF) ITU frequency band, and/or frequencies between 100 Hz to 100 MHz, between 1 kHz and 100 MHz, between 10 kHz and 300 kHz, or between 20 kHz and 200 kHz, or between 35 kHz and 130 kHz, or between 50 kHz and 100 kHz.

The initiation devices are devices for giving rise to an explosion or detonation. The initiation devices can be positioned in the boreholes or the blastholes. The vehicle can communicate with the initiation devices using the MI signals, and the downlink magnetic induction (MI) signals may represent enabling/disabling, encoding, querying, (re)programming, (re)synchronizing, and/or controlling operation and/or firing of selected ones of the initiation devices (as part of enabling/disabling, encoding, querying, (re)programming, (re)synchronizing, and/or controlling the operation and/or firing of selected ones of the initiation devices in association with the commercial blasting operation).

Each initiation device can include a unique identifier (ID) stored in memory in the initiation device. A group of the initiation devices can include a unique group ID (GID) stored in the memory.

The blasting-related device can include one or more sensors that detect, monitor, estimate, or measure physical parameters associated with the physical med in which they are deployed. The sensors can include a set of sensors configured for sensing selected environmental conditions or parameters, including temperature, moisture, pressure, and/or shock.

The blasting-related device can include a housing, shell, case, frame and/or support structure that mechanically houses, carries, protects and/or supports at least pressure and water-sensitive elements of the blasting-related device.

The pressure and water-sensitive elements include device-based electronic elements in the blasting-related device. The device-based electronic elements include: a device power source, a device control unit, and the device-based MI based communication unit.

For the initiation devices, the device-based electronic elements include an initiation element (e.g., a detonator). For the initiation devices, the pressure and water-sensitive elements include device-based explosive elements. The device-based explosive elements include a main explosive charge.

The system can include at least one MI noise monitoring unit (or "background noise measurement unit") including a noise monitoring magnetometer configured for detecting, measuring, or monitoring background magnetic field noise in one or more frequency bands in a commercial blasting environment. The noise monitoring unit can further be configured for communicating a noise signal representing the detected, measured or monitored noise, and/or a set of parameters corresponding to or correlated therewith, to other devices, apparatuses, or systems, such as the blast support vehicle. The one or more frequency bands include the MI frequencies selected for the uplink MI signals and/or the downlink MI signals.

The at least one MI noise monitoring unit can be separate from the blast support vehicle. The MI noise monitoring unit can be carried by a background noise measurement vehicle. The MI noise monitoring unit can be supported by or mounted on a frame or housing that remains stationary at a predetermined position proximate to or within the portion of the physical media intended to be blasted (e.g., on the bench 2). The MI noise monitoring unit includes a power source, a control unit, a set of noise-detection magnetometers, and a communication unit. The communication unit can include a through-the-air (TTA) wireless communication unit and/or an MI based communication unit.

The MI noise monitoring unit can be configured for communicating measured background magnetic field noise signals or signal parameters corresponding thereto to the blast support vehicle, the control unit of which can be configured for compensating for (e.g., subtracting) the measured or estimated background magnetic field noise signals from the MI communication signals detected by the blast support vehicle's set of magnetometers.

Each survey device includes a survey magnetometer configured for measuring or monitoring MI signal strength proximate to or within the portion of the physical media at one or more MI signal frequencies, e.g., between 10 Hz and 10 MHz. The relevant MI signal strength can be the signal strength of downlink MI-based communication and/or the signal strength of uplink MI-based communication. The survey magnetometer can include a receive loop, e.g., with an average diameter from 0.01 m to 1 m; or a fluxgate magnetometer, SQUID magnetometer, AMR magnetometer, or Hall effect magnetometer.

The system can include a MI communication signal survey unit (in a vehicle) that is configured to measure downlink MI communication signal strength when in MI based communication with the blast support vehicle. The MI communication signal survey unit can record and communicate a plurality of measured MI signal strengths or parameters corresponding thereto associated with the locations (e.g., represented by coordinates in a global coordinate system) of different boreholes to the blast support vehicle and/or a database.

The MI signal survey device can be configured to measure the MI based communication signal strength for one or more MI signal frequencies at one or more depths along a length of at least one borehole, or along lengths of a plurality of boreholes. The measured MI based communication signal strength(s) can include measuring the uplink MI communication signal strength (from other in-hole devices) and/or the downlink MI communication signal strength (from the vehicle). The measured signal strength(s) can include measurements for a plurality of hole depths and for a plurality of frequencies at each depth.

The system can include an extendable apparatus (e.g., shaft or winch) that is extendable into and selectively/ selectably positionable along the depth or length of the borehole. The extendable apparatus can carry a survey device (an MI based communication unit) at a predetermined position along the extendable apparatus. The predetermined position can be near or at a distal end of the extendable apparatus. The survey device includes at least a set of magnetic signal sources (e.g., one or more coil antennas), and typically also includes a set of magnetometers. The system can include an MI signal survey controller coupled to the survey device. The MI signal survey controller includes a power source, one or more processing units, a memory, MI based communication control circuitry, and optionally TTA communication circuitry. The MI signal survey controller is configured to control the survey device in association with monitoring, estimating, or determining a current position or depth of the survey device in the borehole. The MI signal survey controller is configured to control the survey device to generate or output uplink MI communication signals at one or more MI signal frequencies at one or more times while the survey device is disposed at one or more positions or depths along the borehole.

The blast support vehicle can be an airborne blast support vehicle positioned above the extendable apparatus. The MI signal survey controller can be configured for TTA wireless communication with the blast support vehicle such that the blast support vehicle's detection or attempted detection of uplink MI signals from the survey device in the borehole can be coordinated with the operation of the survey device's generation of the MI based communication signals under the direction or control of the MI signal survey controller. The blast support vehicle can be configured to generate downlink MI communication signals at one or more MI signal frequencies and/or one or more power levels at one or more times, while the in-hole survey device cooperatively detects or attempts to detect the downlink MI communication signals at one or more positions or depths along the borehole provided by the extendable apparatus. The MI signal survey controller is configured to operate in a coordinated manner with the blast support vehicle's generation of downlink MI communication signals, and to store or record the strengths of detected downlink MI communication signals. The blast support vehicle can store or record the strengths of detected uplink MI communication signals. The blast support vehicle can be configured for TTA wireless communication with the blast modelling/planning system and/or the remote database, and can communicate MI signal strength measurement results thereto, e.g., for subsequent retrieval and use in association with carrying out a commercial blasting operation under consideration.

The blast support vehicle can be in the form of a borehole drill rig that includes the survey device. The borehole drill rig can include a first MI based communication unit of the survey device deployable in a borehole by the shaft, and a second MI based communication unit deployed or deployable above the shaft. The second MI based communication unit includes at least a set of MI signal sources, and optionally a set of magnetometers. Each of the first and second MI based communication units operates under the direction or control of the MI signal survey controller to conduct a survey.

The blast support vehicle can carry one or more MI communication orientation adjustment units by which a spatial orientation of the vehicle-based MI signal source (including the antenna) and/or the set of vehicle-based magnetometers can be adjusted in 1, 2 or 3 mutual orthogonal angular directions to enhance or maximize MI communication signal strength between the blast support vehicle and the wireless blasting-related device(s) disposed or deployed in each borehole. The MI communication orientation adjustment unit can include or be a gimbal or a plurality of individually actuatable arms configured for changing or modifying the spatial orientation of both the MI signal source and the magnetometer(s). Alternatively, the MI communication orientation adjustment unit can include a first gimbal or first plurality of individually actuatable arms configured for modifying the spatial orientation of the blast support vehicle's MI signal source, and a distinct second gimbal or second plurality of individually actuatable arms configured for altering the spatial orientation of the blast support vehicle's magnetometer(s).

The blast support vehicle can be configured to store signal orientation angles corresponding to individual blasting-related devices (e.g., by ID), groups of blasting-related devices (e.g., by GID), individual boreholes (e.g., by coordinates), and/or selected groups of boreholes (e.g., by coordinate groups). The blast support vehicle can be configured to communicate the orientation angles and corresponding device/borehole identifiers to a database for storage.

The MI based communication unit can include a vehicle-based frequency tuner for frequency band or frequency tuning of the vehicle-based MI signal receiver and/or the vehicle-based MI signal source. The vehicle-based frequency tuner can include current sense circuitry configured for monitoring electrical power (current) consumption of the MI signal source (MI signal output or transmission circuitry), and adjusting the MI frequency to maximise the power consumption with a feedback loop (given that at peak resonance the electrical current drawn is or is expected to be highest). Additionally or alternatively, the device-based MI based communication unit may measure a signal strength or signal-to-noise ratio (SNR) of the downlink MI communication signals, and send this measure via the uplink to the vehicle-based frequency tuner, and the vehicle-based frequency tuner can adjust the MI frequency maximise or improve the measured TTE signal strength or SNR, i.e., in a feedback loop.

The blasting-related devices may be configured for establishing one or more ad-hoc MI-based communication networks among or between each other.

The blast support vehicle may be configured for TTA wireless communication with a remotely located or distant blast control system, optionally via TTA wireless communication with a communication hub, node, or hotspot associated with the remotely located blast control apparatus/system.

The blast support vehicle is configured to communicate with the blast control apparatus/system to verify whether the wireless initiation device(s) reside in correct or intended borehole(s) according to data from the blast control apparatus/system, or are non-responsive/dysfunctional or missing.

The wireless initiation devices can be configured to be synchronized to a master clock unit corresponding to or carried by the blast support vehicle by way of the MI based communication between the blast support vehicle and the wireless initiation devices involved in the blast or blast sequence. The blast support vehicle can maintain a master clock, which serves as an absolute time reference for a plurality of other blast support vehicles in the system.

The blast support vehicle can be configured to preclude or prevent direct triggering of wireless initiation device arming and firing.

The system can include the broadcast MI signal source, which includes a current driver providing MI signal modulation circuitry, and a broadcast loop antenna that can be driven by the current driver, configured for generating or outputting broadcast MI communication signals having sufficient strength to be received by the wireless blasting-related devices, e.g., the wireless initiation devices that will be initiated during the blast or blast sequence. The broadcast loop antenna can have an average loop diameter between 1 m and 100 m, or between 1 km and 10 km. The broadcast distance can be greater than 100 meters; greater than multiple or many hundreds of meters; between 200 and 900 meters; greater than a kilometre; or greater than multiple kilometres.

The broadcast MI signal source can output, issue, or broadcast a synchronization signal that can be received and processed by each of the wireless initiation devices that will be involved in the blast or blast sequence, optionally including device IDs and/or GIDs.

The system can include a set of auxiliary blast support vehicles in the form of wireless communication routing/repeater vehicles disposed between the blast support vehicle and the blast control apparatus/system. Such wireless communication routing/repeater vehicles can be configured as TTA wireless communication signal routers/repeaters.

Each marker ("blast monitoring/tracking device") is configured for generating or facilitating the generation of position or location signals that correspond to, indicate, or identify the marker's physical position or location before and/or after the commercial blasting operation.

The plurality of markers are configured to reside in boreholes in which the initiation devices reside, and/or in auxiliary boreholes located proximate to and separate from the boreholes 50 in which the initiation devices reside. The marker can be coupled or attached to an initiation device. The marker can be integrated into an initiation device such that the marker and the initiation device are both within the housing. The marker and the initiation device can be configured to utilize different MI signal frequency bands or frequencies for MI based position localization and MI based communication respectively. The frequencies for MI based position localization may include frequencies between 10 Hz and 10 MHz. The marker can include a receive loop with an average diameter from 0.01 m to 1 m; or a fluxgate magnetometer, SQUID magnetometer, AMR magnetometer, or Hall effect magnetometer.

Each marker can be assigned or programmed with its own unique ID. A selected group of markers can be assigned or programmed with a unique GID for that group.

The markers and blast support vehicles can be configured to perform localization at a first MI signal frequency; and to perform MI communication at a second MI signal frequency different from the first MI signal frequency. The first MI signal frequency used for localization can be lower than the second MI signal frequency used for communication.

The vehicles (in particular the airborne vehicles) can carry imaging apparatuses or devices configured for capturing pre-blast, in-blast, and/or post-blast images and/or videos for aiding automated analysis of pre-blast, in-blast, and/or post-blast conditions. The imaging apparatuses or devices can include high speed cameras configurable or configured for capturing visible/visual wavelength band or infrared wavelength band images and/or videos before, during, and after a blast; and/or a hyperspectral imaging device configured for capturing images and/or videos before, during, and after a blast.

Described herein is a method for assisting blasting, the method including:
deploying at least one wireless blasting-related device in physical media proximate to or within a portion of the physical media intended to be blasted as part of a commercial blasting operation;
communicating to the blasting-related device using downlink MI communication that is through the earth (TTE); and
receiving communications from the blasting-related device to a vehicle-based MI signal receiver using uplink MI communication that is TTE.

The uplink MI communication is transition region or zone signal MI communication. The downlink communication is near-field signal MI communication.

The method can include a vehicle parking or landing such that its vehicle-based MI signal receiver is directly over an opening of a borehole containing the deployed wireless blasting-related device in a borehole, or between a plurality of boreholes.

The method can include the vehicle transitioning to a quiescent state in which its locomotion elements are in a power standby state in order to minimize induced magnetic field noise.

The method can include the vehicle measuring and compensating for magnetic field noise corresponding to or falling within one or more frequency bands. The measuring and compensating can include measuring magnetic field noise signals in one or more selected noise frequency bands, which are selected to correspond to or be correlated with background magnetic field noise and/or induced magnetic field noise generated by the blast support vehicle's locomotion elements and electronics elements. The measuring and compensating can use the magnetometer(s) utilized for MI based communication or different magnetometer(s) utilized for noise measurements.

The method can include the vehicle using different MI signal orientation angles in order to determine an MI signal orientation angle that enhances or maximizes MI signal strength and MI based communication reliability between the blast support vehicle and the wireless initiation device.

The method may include MI communication signal frequency band or frequency tuning, optionally including self-tuning can by way of current sense circuitry configured for monitoring the electrical current consumption of MI signal output or transmission circuitry.

The method may include recording and communicating a plurality of measured MI signal strengths or parameters corresponding thereto associated with the locations (e.g., represented by coordinates in a global coordinate system) of different boreholes to the blast support vehicle and/or a database.

The method may include measuring the MI based communication signal strength for one or more MI signal frequencies at one or more depths along a length of at least one borehole, or along lengths of a plurality of boreholes. The method may include selectively/selectably positioning an MI survey device along the depth or length of a borehole.

The method may include establishing one or more ad-hoc MI-based communication networks between a plurality of blasting-related devices.

The method may include TTA wireless communication with a remotely located or distant blast control system, optionally via TTA wireless communication with a communication hub, node, or hotspot associated with the remotely located blast control apparatus/system.

The method may include communicating with the blast control apparatus/system to verify whether the wireless initiation device(s) reside in correct or intended borehole(s) according to data from the blast control apparatus/system, or are non-responsive/dysfunctional or missing.

The method may include synchronizing to a master clock unit corresponding to or carried by the blast support vehicle by way of the MI based communication between the blast support vehicle and the wireless initiation devices involved in the blast or blast sequence.

The method may include generating or outputting broadcast MI communication signals having sufficient strength to be received by the wireless blasting-related devices, e.g., the wireless initiation devices that will be initiated during the blast or blast sequence.

The method may include broadcasting an MI synchronization signal that can be received and processed by a plurality of the wireless initiation devices, optionally including device IDs and/or GIDs.

The method may include wireless communication routing TTA using repeaters.

The method may include generating position or location signals that correspond to, indicate, or identify a marker's physical position or location before and/or after the commercial blasting operation.

The method may include performing localization at a first MI signal frequency, and to performing MI communication at a second MI signal frequency different from the first MI signal frequency.

The method may include capturing pre-blast, in-blast, and/or post-blast images and/or videos for aiding automated analysis of pre-blast, in-blast, and/or post-blast conditions.

BRIEF DESCRIPTION OF THE FIGURES

Some embodiments are hereinafter described, by way of non-limiting example only, with reference to the accompanying drawings, in which.

DETAILED DESCRIPTION

Figure 1A:
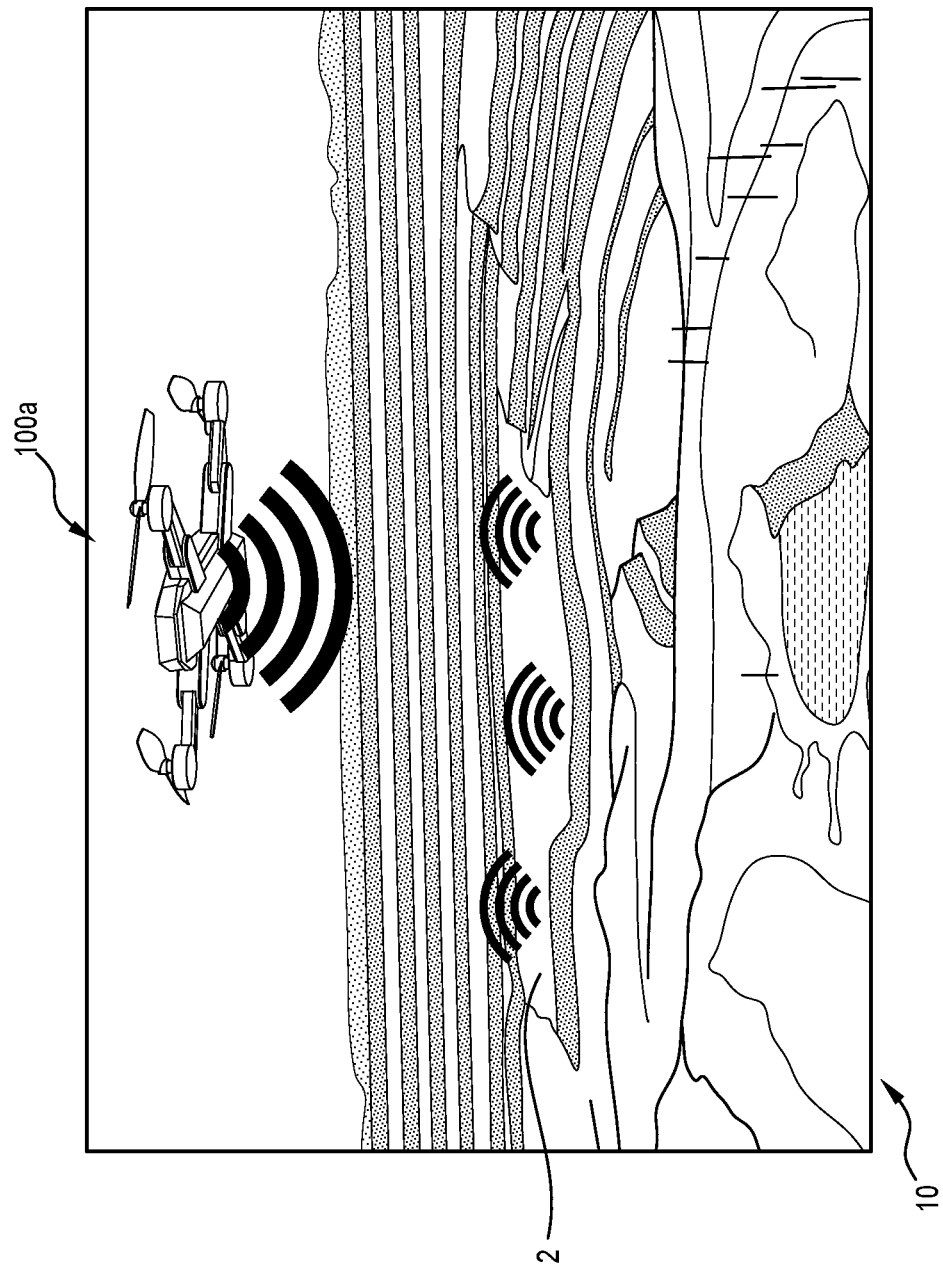
FIGS. 1A to 2B are schematic diagrams of a system for assisting commercial blasting described herein.

Aspects of the present disclosure relate to systems for assisting commercial blasting including one or more types of blast support vehicles configured for sending magnetic induction (MI) signals to and/or receiving MI signals from wireless blasting-related devices that are deployable or deployed within portions of at least one physical medium (e.g., a rock formation) intended to be blasted as part of a commercial blasting operation. Such wireless blasting-related devices include wireless initiation devices positioned in boreholes or blastholes, with which blast support vehicles communicate as part of enabling/disabling, encoding, querying, (re)programming, (re)synchronizing, and/or controlling the operation and/or firing of particular wireless initiation devices in association with the commercial blasting operation.

With respect to signal communication between a signal source and a signal receiver or detector, the terms "through the earth," "TTE," and "sub-surface" include or refer to the communication of signals in, through, and/or across a set of physical media residing between the signal source and the signal receiver or detector, e.g., wherein at least one of the signal source and the signal detector is at least partially obstructed, overlaid, covered, surrounded, buried, enclosed, or encased by the set of physical media. The set of physical media can include one or more of rock, broken rock, stone, rubble, debris, gravel, cement, concrete, stemming material, soil, dirt, sand, clay, mud, sediment, snow, ice, one or more hydrocarbon fuel reservoirs, site infrastructure, building/construction materials, and/or other media or materials. In various embodiments, TTE or sub-surface communication includes or is magnetic induction (MI) based communication.

With respect to MI related communication terminology used herein, the terms "magnetic induction based communication," "MI based communication," and "MI communication" refer to the generation of a magnetic field, which in various embodiments includes a quasi-static magnetic field, in accordance with a modulation scheme or protocol to wirelessly communicate signals between a MI signal source that generates or outputs the modulated magnetic field and an MI signal receiver that receives or detects such signals, e.g., by way of detecting and decoding the modulated magnetic field. In multiple embodiments, the MI signal source includes an electrically conductive coil or loop antenna, and the MI signal receiver includes a magnetometer. MI based communication can involve, include, or be (a) near-field signal communication, in which the MI signal receiver is located within a near-field region or zone of the magnetic field generated by the MI signal source, wherein magnetic field strength as a function of distance away from the MI signal source decays in accordance with an inverse distance cubed relationship, and the MI signal source detects changes in near-field magnetic flux generated by the MI signal source rather than detecting far-field or radiatively propagated electromagnetic waves (e.g., radio waves) generated by the MI signal source; and/or (b) transition region or zone signal communication, in which the MI signal receiver resides beyond the near-field region or zone of the magnetic field generated by the MI signal source, but resides within approximately one-half of a wavelength away from the MI signal source, and more commonly or particularly resides within approximately 10 skin depths (e.g., less than 10 skin depths), approximately 6-8 skin depths (e.g., less than 8 skin depths), approximately 3-5 skin depths (e.g., less than 5 skin depths), or approximately 2-4 skin depths (e.g., less than 4 skin depths) away from the MI signal source, wherein the near-field inverse distance cubed magnetic field strength decay relationship is modified (e.g., as a result of interaction(s) between near-field and far-field magnetic flux, and/or secondary fields that are induced by way of the physical media in or through which signal communication occurs). Individuals having ordinary skill in the relevant art, e.g., in relation to TTE communication, will understand the meaning or definition of skin depth. It can be noted that skin depth is the same physical property that individuals having ordinary skill in electrical engineering understand with respect to current crowding, e.g., in wires, for alternating current (AC) signals. Individuals having ordinary skill in the relevant art will further understand that in conductive media, an MI signal wavelength will be approximately $2*\pi*\delta$, where $\delta$ is the skin depth, and hence one-half wavelength is approximately 3.1 skin depths. Typical earth media or materials, e.g., media or materials in/below the ground, can be categorized as conductive in this sense.

In view of the foregoing, the transition zone thus exists between the near-field and the far-field zones of the magnetic field generated by the MI signal source; hence, individuals having ordinary skill in the art will recognize that in transition zone communication, even though the MI signal receiver resides beyond or outside of the near-field region of the magnetic field generated by the MI signal source, the MI signal receiver does not reside in the far-field region or zone of the magnetic field generated by the MI signal source. Further in view of the foregoing, with respect to the generation of signals by an MI signal source and the detection of such signals by an MI signal receiver, MI based communication in accordance with various embodiments of the present disclosure can involve, include, or be (i) near-field signal communication, and/or (ii) transition zone signal communication, depending upon embodiment details, a commercial blasting operation under consideration, and/or a commercial blasting environment under consideration.

An MI signal source can also be referred to as an MI signal transmitter; however, individuals having ordinary skill in the relevant art will understand that communication between an MI signal transmitter and an MI signal receiver in accordance with various embodiments of the present disclosure occurs or predominantly occurs by way of the generation and detection of variations in a magnetic field, e.g., in a near-field zone or a transition zone as set forth above. The terms "magnetic induction communication signal," "MI communication signal," and "MI signal" refer to a signal encoded upon a magnetic field, e.g., a quasi-static magnetic field generated by a magnetic signal source, by way of a modulation scheme or protocol.

The term "explosive composition" refers to a chemical composition capable of undergoing initiation and producing an explosion in association with the release of its own internal chemical energy. An explosive composition of appropriate type and/or under appropriate physical conditions may further undergo detonation. The terms "explosive material," and "explosive substance" refer to a material or substance that carries or includes an explosive composition.

The term "initiation" refers to the initiation or triggering of combustion, a deflagration, a deflagration to detonation transition (DDT), or detonation in a material or substance carrying an explosive composition, and the associated formation of different chemical species, or the initiation of chemical reactions that result in combustion and the associated formation of different chemical species in the material or substance. The term "explosive initiation" refers to initiation giving rise to an explosion or detonation, the occurrence of which corresponds to or is defined by at least some of a rapid energy release, volume increase, temperature increase, and gas production or release, as well as the generation of at least a subsonic shock wave. The term "detonation" refers to the generation of a supersonic detonation wave or shock front in an explosive material or substance, in a manner understood by individuals having ordinary skill in the relevant art.

The term "commercial blasting operation" includes the initiation and/or detonation of explosive materials or substances disposed in the physical media, e.g., a geological formation, by way of initiation devices as part of mining, quarrying, civil construction/demolition, seismic exploration, and/or another non-military blasting operation. Such initiation and/or detonation explosively blasts, e.g., fractures and/or heaves, or the physical medium in which the commercial blasting operation occurs. Such initiation and/or detonation can be referred to as blasting, in a manner readily understood by individuals having ordinary skill in the relevant art. The physical medium in which the commercial blasting operation occurs is located in a commercial blasting environment, such as a mining environment, e.g., an open cut or underground mine.

The terms "initiation device" and "explosive initiation device" refer to a device configured for initiating and/or detonating an explosive material, substance, or composition as part of a commercial blasting operation. In various embodiments, an initiation device is configured to reside within a borehole or blasthole formed or drilled in the physical medium in which the commercial blasting operation occurs, where a borehole can be categorized or defined as a typically elongate hole that does not contain or is not intended to contain explosive material(s), or which does not contain or is not intended to contain explosive material(s) and a set of initiation devices configured for the initiation and/or detonation thereof; and a blasthole can be categorized or defined as a typically elongate hole that does contain or is intended to contain explosive material(s), or which does contain or is intended to contain explosive material(s) and a set of initiation devices configured for the initiation and/or detonation thereof. An explosive initiation device can include or be a primer, e.g., a primed booster, in a manner readily understood by individuals having ordinary skill in the relevant art.

The term "wireless blasting-related device" refers to a device configured for deployment near or in a portion of a physical medium, e.g., a confined space such as a borehole or blasthole formed in the physical medium, that is intended to be blasted as part of a commercial blasting operation. A wireless blasting-related device does not require or utilize wires that link the device to a non-local or remote control system or apparatus for the transfer of signals, commands, and data between the wireless blasting-related device and the non-local or remote control system or apparatus. Wireless blasting-related devices in accordance with various embodiments of the present disclosure can be configured for bidirectional or 2-way MI based communication. Wireless blasting-related devices include at least some of wireless initiation devices, wireless MI signal survey devices, and wireless blast monitoring/tracking devices.

The terms "wireless initiation device" or "wireless explosive initiation device" refer to a device configured for deployment near or in a portion of a physical medium, e.g., a confined space such as a blasthole within the physical medium, intended to be blasted as part of a commercial blasting operation, which is configured for initiating and/or detonating an explosive material, substance, or composition as part of the commercial blasting operation, and which does not require or utilize wires that link the wireless initiation device to an external control apparatus or controller located remote from the wireless initiation device for the transfer of signals, data, and commands between the external control apparatus or controller and the wireless initiation device, but which rather utilizes MI based communication for such signal, data, and command transfer. In some embodiments, wireless initiation devices can include one or more types of sensors that detect, monitor, estimate, or measure particular physical parameters associated with the physical medium in which they are deployed.

The term "MI signal survey device" refers to a device configured for deployment proximate to or within portions of a physical medium, e.g., a confined space such as a borehole or blasthole within the physical medium, intended to be blasted as part of a commercial blasting operation, and which includes a magnetometer (referred to herein as a "survey magnetometer") configured for measuring or monitoring downlink and/or uplink MI based communication signal strength near or within portions of this physical medium at one or more MI signal frequencies.

The terms "wireless blast monitoring device," "wireless blast tracking device," and "wireless blast monitoring/tracking device" refer to a device configured for deployment near or in a portion of a physical medium, e.g., a confined space such as a borehole or blasthole within the physical medium, intended to be blasted as part of a commercial blasting operation, and which is configured for generating or facilitating the generation of position or location signals that correspond to, indicate, or identify the device's physical position or location before and/or after the commercial blasting operation. In some embodiments, wireless blast monitoring/tracking devices can include one or more types of sensors that detect, monitor, estimate, or measure particular physical parameters associated with the physical medium in which they are deployed.

As described in further detail hereinafter, the (explosive) initiation device, wireless blasting-related device, wireless (explosive) initiation device, MI signal survey device, and wireless blast monitoring/tracking device, in embodiments, include each a housing, shell, case, frame and/or support structure that mechanically houses, carries, protects and/or supports at least pressure and water-sensitive elements of the device, including device-based electronic elements in the device.

The term "blast support vehicle" includes or is a mechanized or robotic platform or structure having a prime mover, motor, engine, and/or power source, which is configured for locomotion such that it can be selectively/selectably deployed, positioned, directed, guided, manoeuvred, piloted, or driven to multiple physical locations as part of supporting or facilitating a commercial blasting operation, and which is configured MI based communication with wireless blasting-related devices that are deployable or deployed within portions of a medium intended to be blasted as part of a commercial blasting operation. A blast support vehicle typically includes a control unit, and in various embodiments is automated (e.g., remotely controlled, driven, or piloted by an off-vehicle human) or autonomous (e.g., fully autonomous, making decisions or carrying out programmed actions without human supervision), although in some embodiments a blast support vehicle can be human operated (e.g., driven by an on-vehicle human). Particular blast support vehicles can be configured for MI based communication with wireless initiation devices, MI signal survey devices, and/or blast monitoring/tracking devices.

The term "auxiliary blast support equipment" refers to equipment, apparatuses, or devices that aid functions performable or performed by a blast support vehicle in association with a commercial blasting operation. Auxiliary blast support equipment can be carried by a blast support vehicle or a separate auxiliary blast support vehicle, or can be deployed in a stand-alone manner. The term "auxiliary blast support vehicle" refers to a mechanized or robotic platform or structure having a prime mover, motor, engine, and/or power source, which is configured for locomotion such that it can be selectively/selectably deployed, positioned, directed, guided, manoeuvred, piloted, or driven to multiple physical locations in association with a commercial blasting operation, and which carries one or more types of auxiliary blast support equipment, but which may not be configured for directly communicating with wireless blasting-related devices deployed in a physical medium intended to be blasted. An auxiliary blast support vehicle typically includes a control unit, and in various embodiments is automated (e.g., remotely controlled, driven, or piloted by an off-vehicle human, where the control unit is a remote-control unit) or autonomous (e.g., fully autonomous, making decisions or carrying out programmed actions without human supervision, where the control unit is an autonomous-control unit), although in some embodiments a blast support vehicle can be human operated (e.g., driven by an on-vehicle human).

The term "MI noise monitoring unit" or "background MI noise monitoring unit" refers to auxiliary blast support equipment having a magnetometer (also referred to as a "background noise magnetometer" or "noise monitoring magnetometer") configured for detecting, measuring, or monitoring magnetic field background noise corresponding to one or more frequency bands in a commercial blasting environment, and which can further be configured for communicating a measured magnetic field background noise signal and/or a set of parameters corresponding to or correlated therewith to other devices, apparatuses, or systems, such as blast support vehicles.

Overview

Embodiments in accordance with the present disclosure are directed to commercial blasting systems, subsystems, apparatuses, devices, techniques, processes, and/or procedures providing blast support vehicles that are equipped with MI based communication units, and which are configured for selectively supporting/facilitating/controlling/enabling/disabling/monitoring commercial blasting operations by way of MI based communication with wireless blasting-related devices that also carry MI based communication units and which are deployable or deployed along or within portions of a physical medium (e.g., a rock formation) that can be, will be, or is intended to be blasted as part of a commercial blasting operation.

Blast support vehicles in accordance with embodiments of the present disclosure can be configured for one or more types of travel, including airborne and/or land based travel, depending upon embodiment details, a type of commercial blasting operation under consideration, and/or a type of commercial blasting environment under consideration. In multiple embodiments, blast support vehicles lack human occupants or passengers; however, in some embodiments one or more types of blast support vehicles can carry a human occupant or passenger. Blast support vehicles can be human operated (e.g., driven by an on-vehicle human), automated (e.g., remotely controlled, driven, or piloted by an off-vehicle human), or autonomous (e.g., fully autonomous, making decisions or carrying out programmed actions without human supervision) depending upon embodiment details.

Wireless blasting-related devices include wireless initiation devices, e.g., which are positionable or positioned in boreholes and/or blastholes, with which blast support vehicles can communicate as part of enabling/disabling, encoding, querying, (re)programming, (re)synchronizing, and/or controlling the operation and/or firing of particular wireless initiation devices in association with a commercial blasting operation. Wireless blasting-related devices can additionally include MI signal survey devices, wireless blast monitoring/tracking devices, and/or other devices.

Various embodiments in accordance with the present disclosure are configured for bidirectional MI based communication between blast support vehicles and wireless blasting-related devices, including bidirectional MI based communication between blast support vehicles and wireless initiation devices. In such embodiments, MI signal communication between a blast support vehicle and a wireless blasting-related device (e.g., which is at least partially surrounded by or deployed or embedded in a physical medium or external environment that will be or is intended to be blasted) can be referred to as downlink MI communication; and MI signal communication between a wireless blasting-related device (e.g., which is at least partially surrounded by or deployed or embedded in the physical medium or external environment that will be or is intended to be blasted) and a blast support vehicle can be referred to as uplink MI communication. Thus, in various embodiments blast support vehicles are configured for generating, outputting, or transmitting downlink MI communication signals, which one or more wireless blasting-related devices can receive, decode, and process; and wireless blasting-related devices are configured for generating, outputting, or transmitting uplink MI communication signals, which one or more blast support vehicles can receive, decode, and process. Notwithstanding the foregoing, in certain embodiments, at least some wireless blasting-related devices, such as particular wireless initiation devices, can be configured only for unidirectional or 1-way MI based communication, in which such wireless initiation devices can receive, decode, and process downlink MI communication signals, but are not enabled, configurable, or configured for or capable of generating, outputting, or transmitting uplink MI communication signals.

In some wireless MI communication based commercial blasting operations, such as in certain underground/deep underground mining operations, reliable sub-surface (e.g., with respect to the surface of the earth, or a reference surface of a chamber within the earth) and/or through-the-earth (TTE) MI signal detection may be required over significant, very significant, or long TTE distances, for instance: distances greater than approximately 100 meters; distances of multiple or many hundreds of meters, e.g., approximately 200-900 meters; or distances on the order of a kilometre or possibly more. Individuals having ordinary skill in the art will recognize that reliable TTE MI based communication over such distances can be facilitated by way of an appropriate MI signal frequency, such as a frequency falling within the ultra low frequency (ULF) band or very low frequency (VLF) band as defined by the International Telecommunications Union (ITU). Additionally, because the strength or magnitude of a magnetic field as a function of distance away from an MI signal source decays in accordance with an inverse distance cubed relationship in the near-field zone, individuals having ordinary skill in the relevant art will recognize that reliable TTE MI based communication over significant, very significant, or long distances can involve a large or very large MI signal source such as a coil or loop antenna having a spatial extent or average diameter greater than a meter or multiple/several meters to several tens of meters or more; and/or an MI signal source that is driven at a relatively high, high, or very high power level.

It can be noted that a wireless blasting-related device typically has shape/geometry and size constraints that limit the shape/geometry, size, and electrical charge storage capacity of its electrical power source(s), as well as the shape/geometry and size of at least one of its device-based MI signal source and device-based MI signal receiver. Such shape/geometry, size constraints, and electrical charge storage capacity constraints are often imposed or dictated by the manner(s) in which the wireless blasting-related device is deployable or typically deployed in one or more types of physical media. For instance, a wireless blasting-related device configured for deployment in a borehole or blasthole has perpendicular cross sectional area or maximum diameter that is limited by borehole diameter; and a length that can be limited by (a) a manner in which the wireless-blasting device is loaded into the borehole for reliably achieving an intended blast outcome (e.g., a target extent of rock fragmentation and/or heave), and possibly (b) the presence of other borehole contents, such as a quantity or volume of explosive medium that should be present in the borehole for reliably achieving the intended blast outcome.

Overview Summary

It is disclosed herein that, for several types of commercial blasting operations, reliable sub-surface and/or TTE signal MI signal detection may typically be required over shorter or significantly shorter distances relative to the significant, very significant, or long distances indicated above. For instance, in several underground mining blasting operations, as well as various open cut mining or civil construction/demolition blasting operations, reliable MI signal detection may be required over distances less than approximately 100 meters; or distances less than approximately 80 meters; or distances less than 60 meters, e.g., distances between approximately 0.10-60, 0.25-50, 0.50-40, or 1-30 meters. With respect to such shorter distance MI based communication, it is disclosed herein that: (i) reliable or generally reliable 2-way MI based communication between blast support vehicles and wireless blasting-related devices is feasible in view of the aforementioned shape/geometry and size constraints imposed on wireless blasting-related devices; and (ii) compared to reliable or generally reliable MI based communication over the aforementioned significant, very significant, or long distances, communication frequency constraints or requirements can be at least somewhat relaxed. More particularly, it is disclosed herein that reliable or generally reliable 2-way MI based communication over such shorter distances can occur by way of MI communication frequencies that can extend at least into the low frequency (LF) ITU frequency band, e.g., including frequencies between approximately 10 kHz-300 kHz, or between approximately 20-200 kHz, or between approximately 35 kHz-130 kHz, or between about 50-100 kHz. As indicated above, such shorter distance MI based communication can involve, include, and/or be near-field and/or intermediate zone signal communication with respect to the magnetic field(s) generated by an MI signal source under consideration.

In view of the aforementioned shape/geometry and size constraints, wireless blasting-related devices configured for receiving downlink MI communication signals generated by blast support vehicles and generating uplink MI communication signals detectable by blast support vehicles typically carry smaller or significantly smaller power sources, MI signal sources, and possibly MI signal receivers than those carried by blast support vehicles. Further in association with the foregoing, uplink MI communication signals generated by wireless blasting-related devices can have a peak, average, or root mean square amplitude less than that of downlink MI communication signals generated by blast support vehicles. In several embodiments in accordance with the present disclosure, particular MI based communication parameters corresponding to a given commercial blasting operation, such as but not limited to communication frequency or frequencies, can be managed, determined, selected, adjusted, tailored, tuned, verified, and/or optimized in association with planning, preparing, and/or configuring the commercial blasting operation, including shortly or immediately prior to carrying out the commercial blasting operation, as further elaborated upon below. Additionally, in multiple embodiments, blast support vehicles' reliable detection and decoding of uplink MI communication signals generated by wireless blasting-related devices can be aided by MI noise management, reduction, and/or compensation techniques, as also detailed below.

Figure 1B:
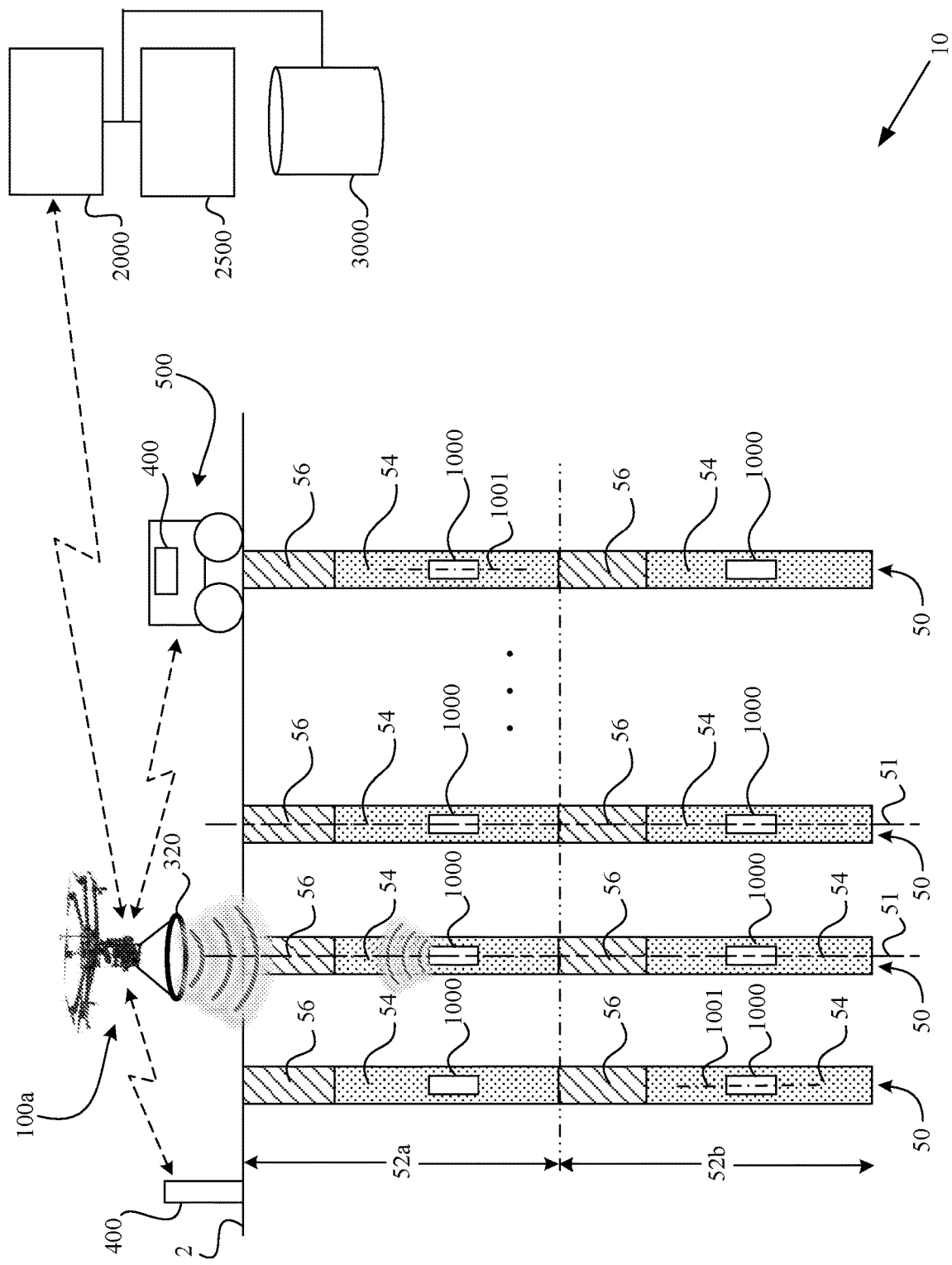
Figure 1C:
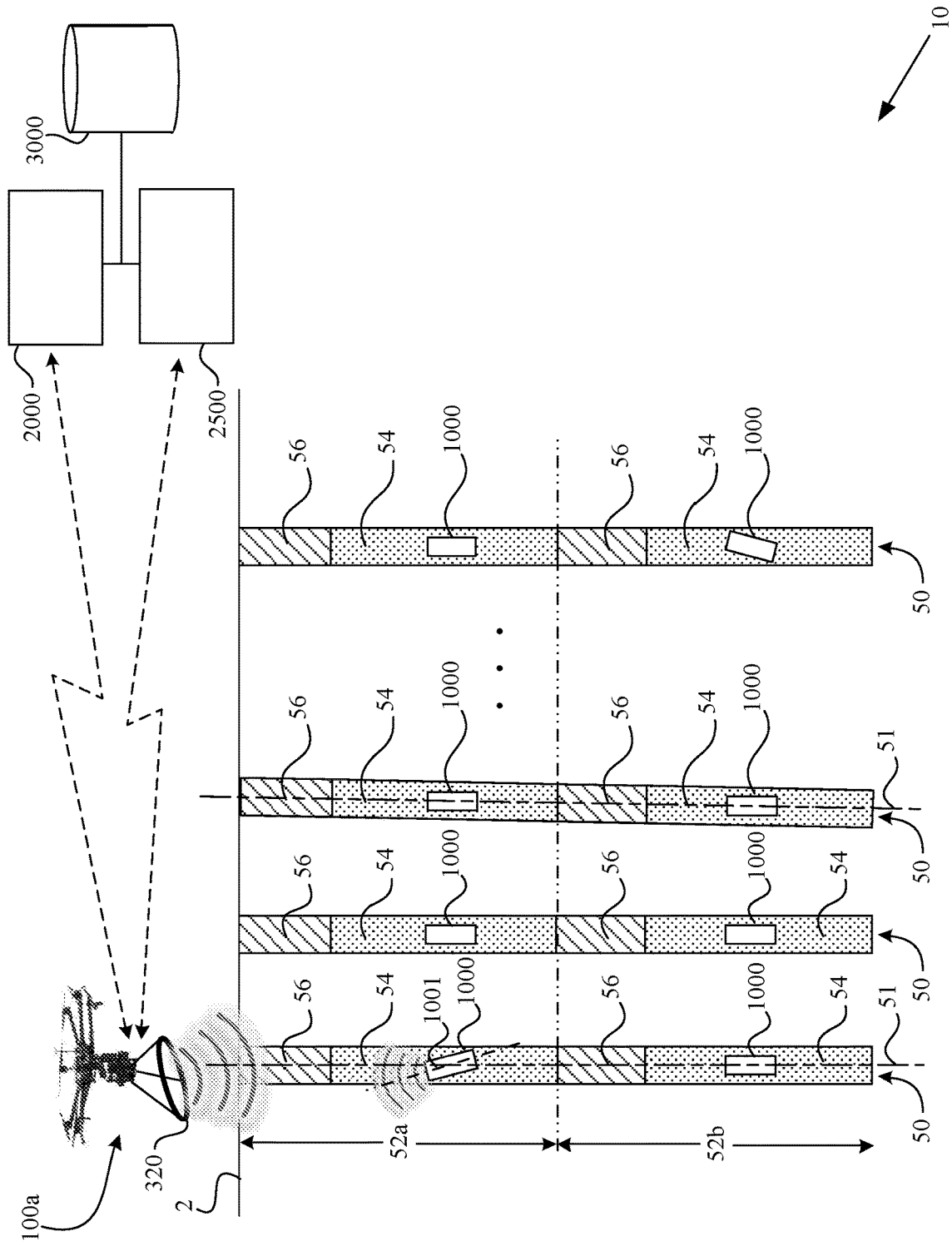
Figure 1D:
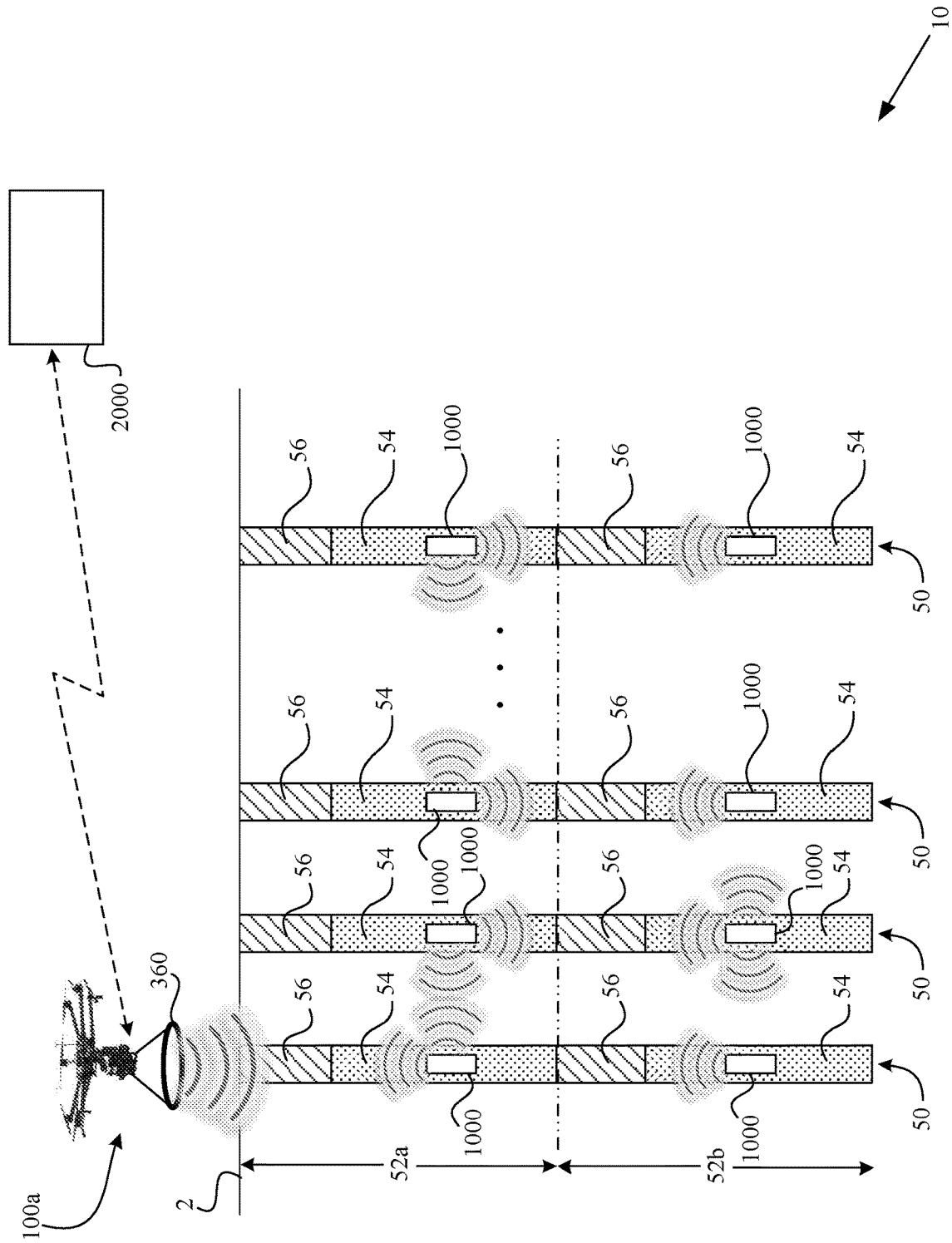
Figure 1E:
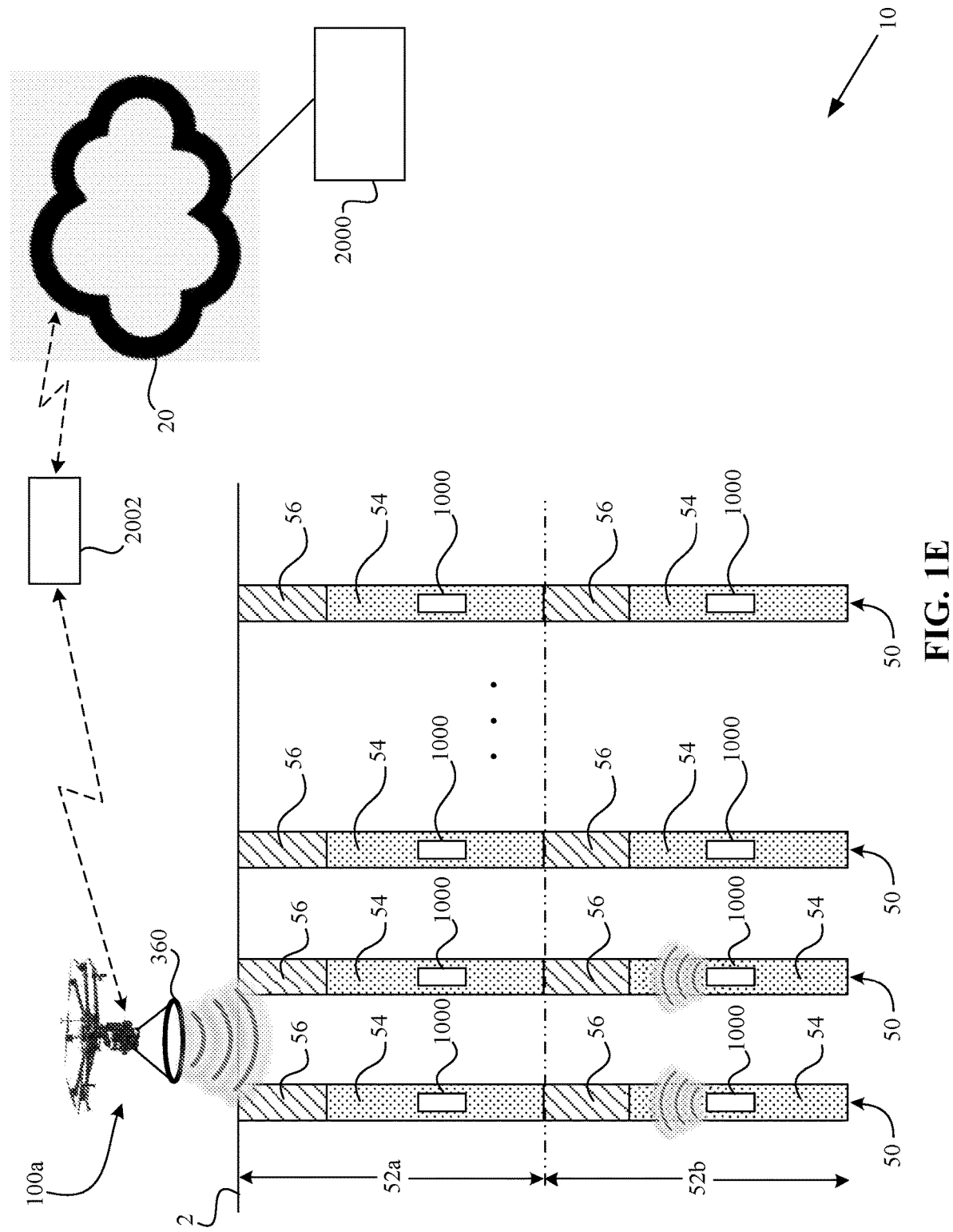
Figure 1F:
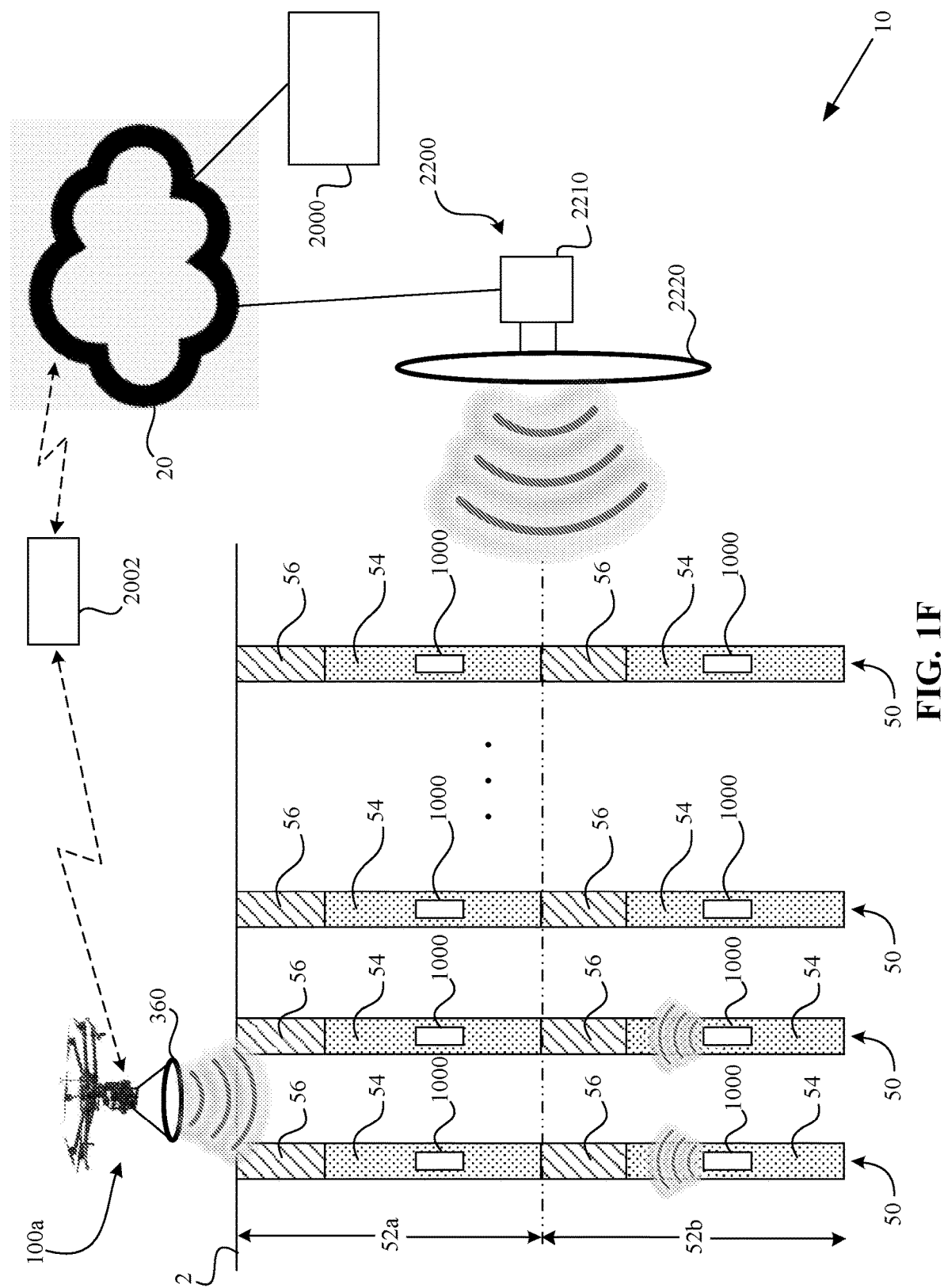
Figure 1G:
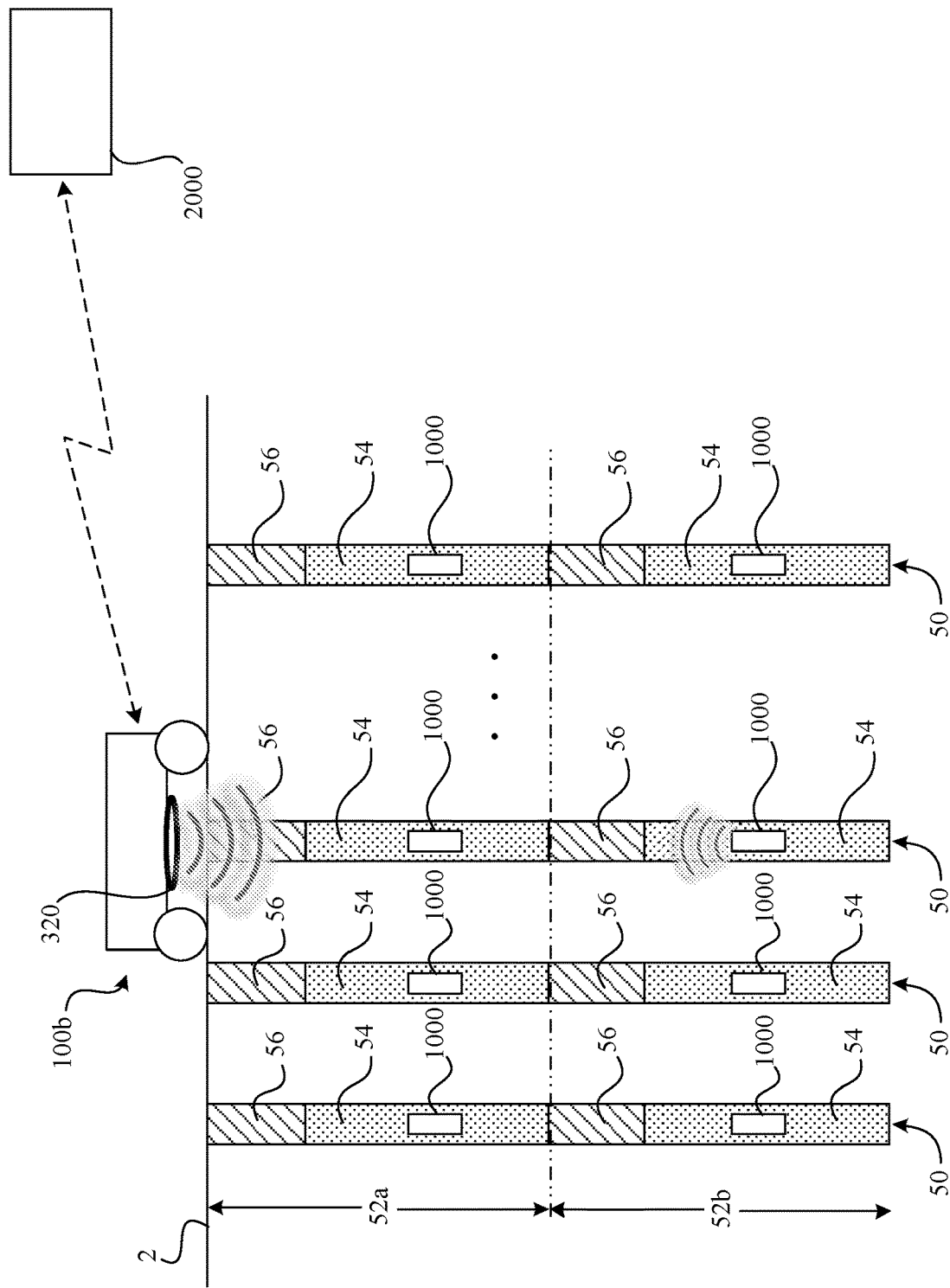
Figure 1H:
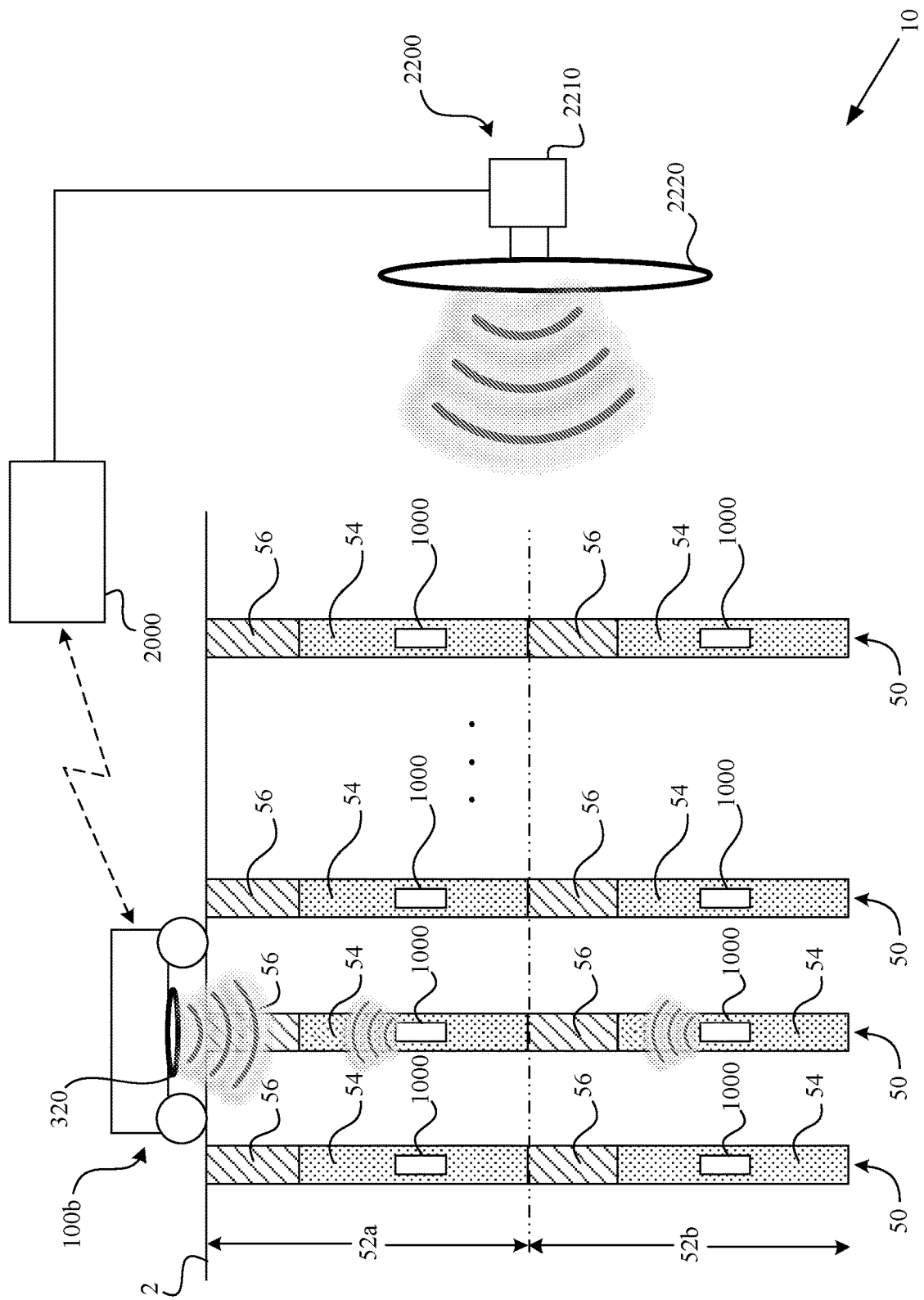
Figure 11:
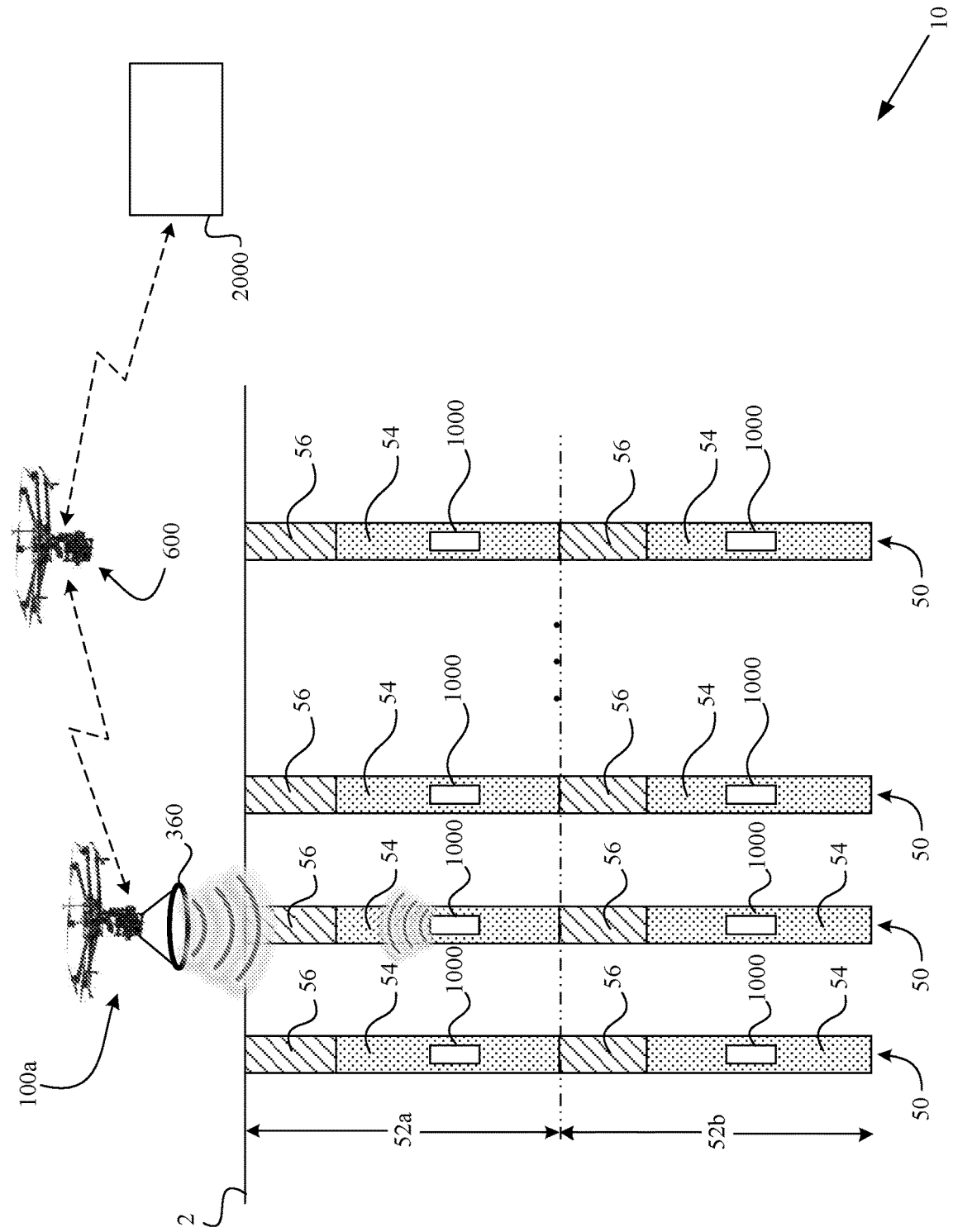
Figure 1J:
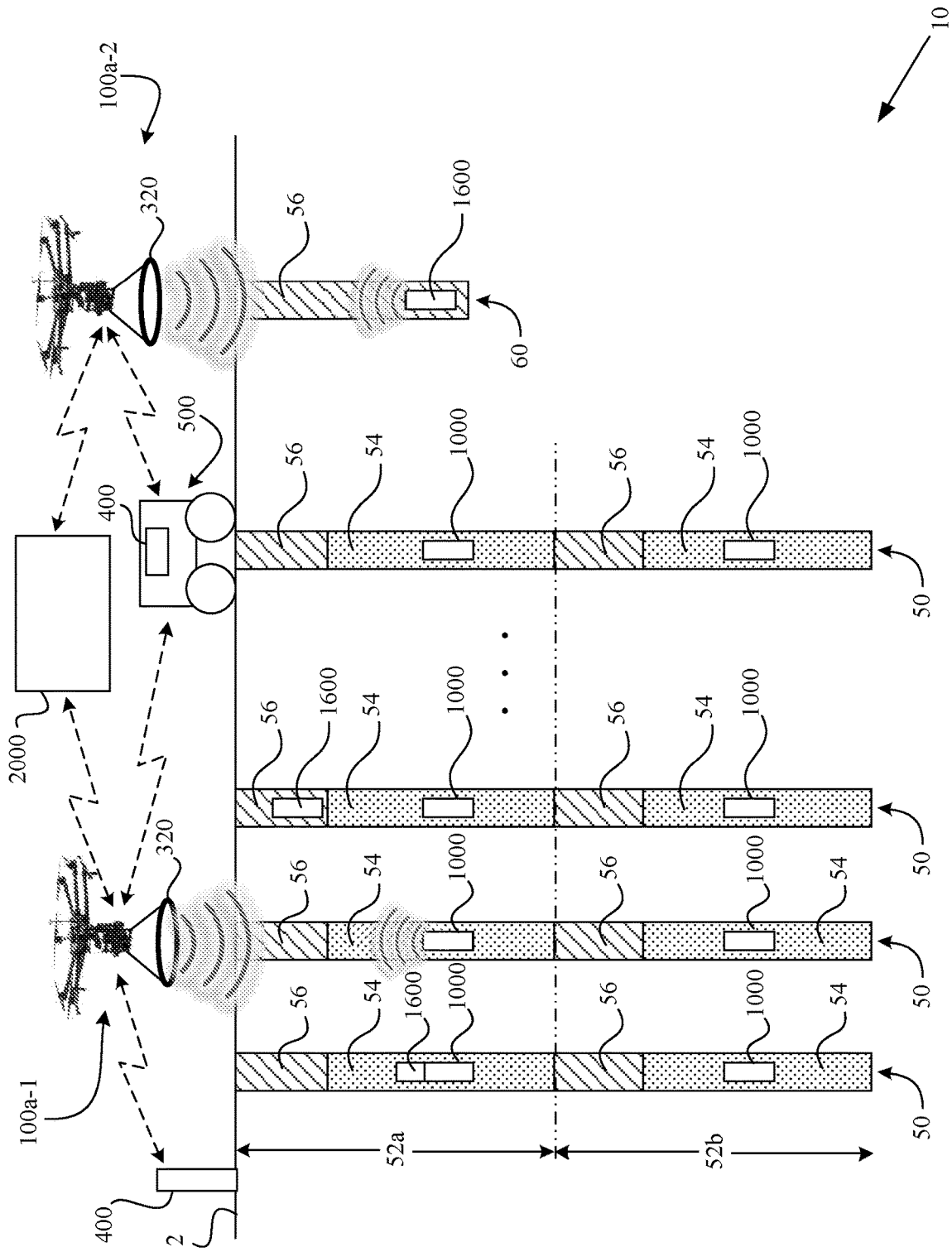
Figure 1K:
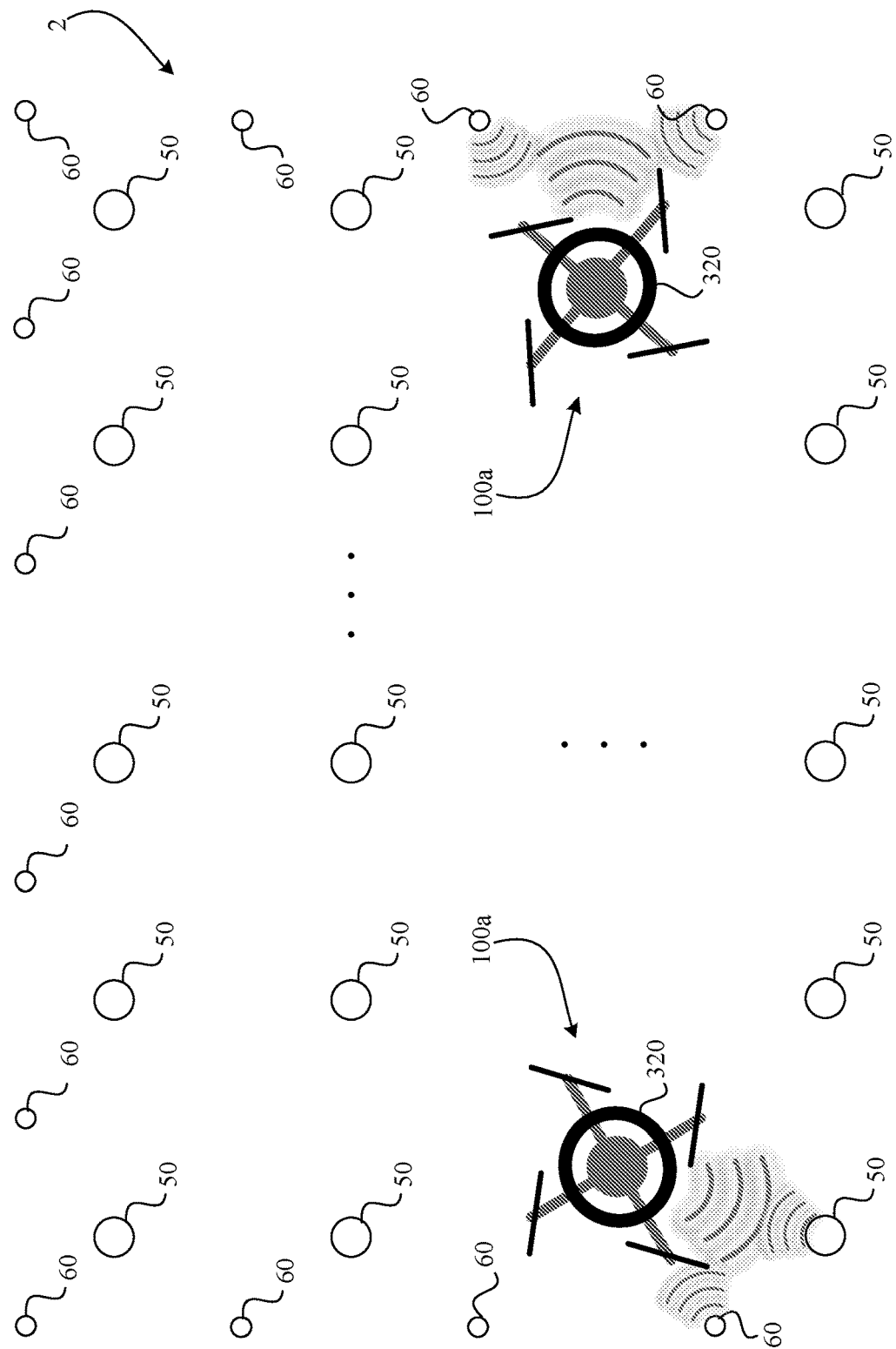
Figure 1L:
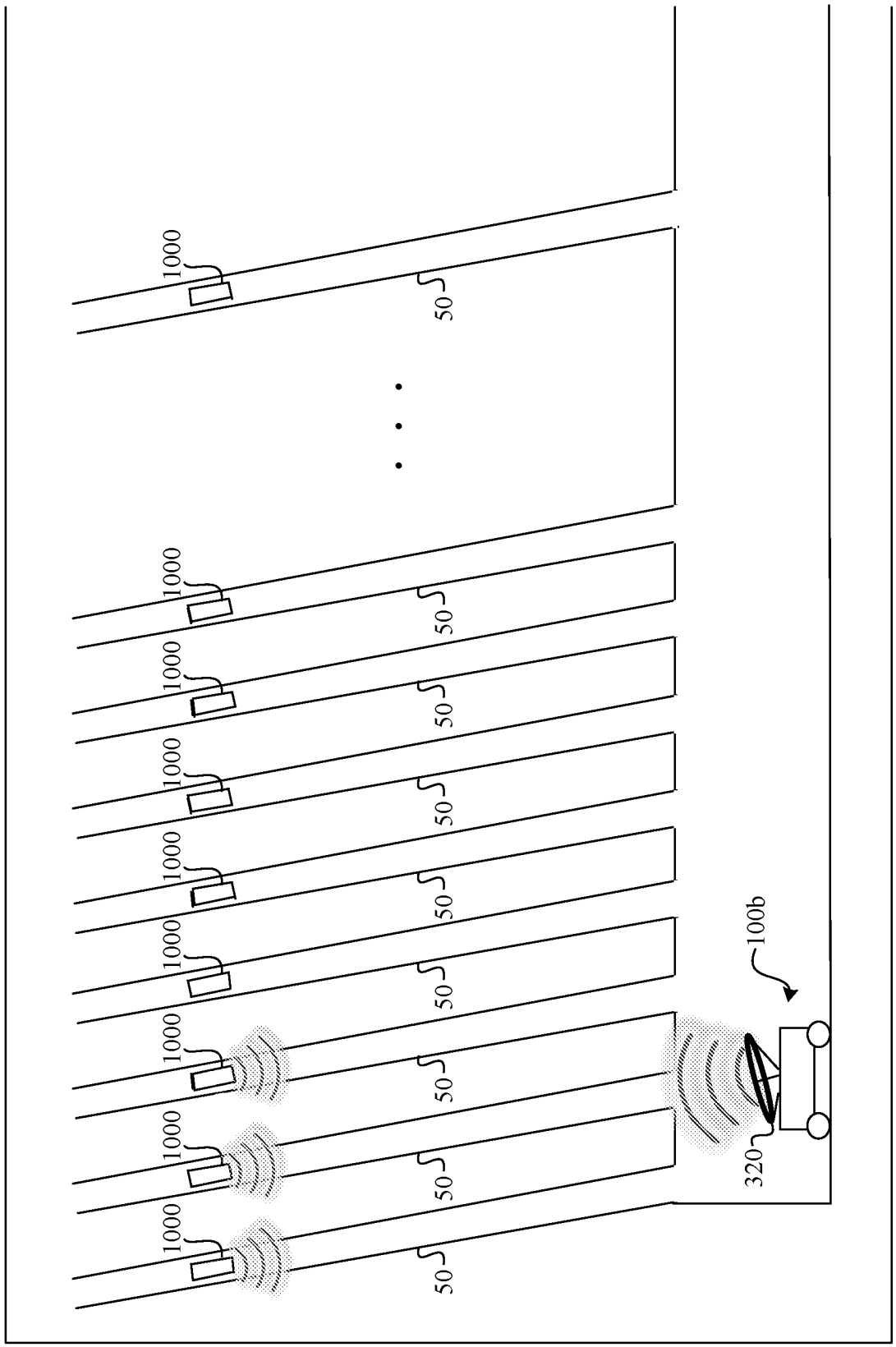
Figure 2A:
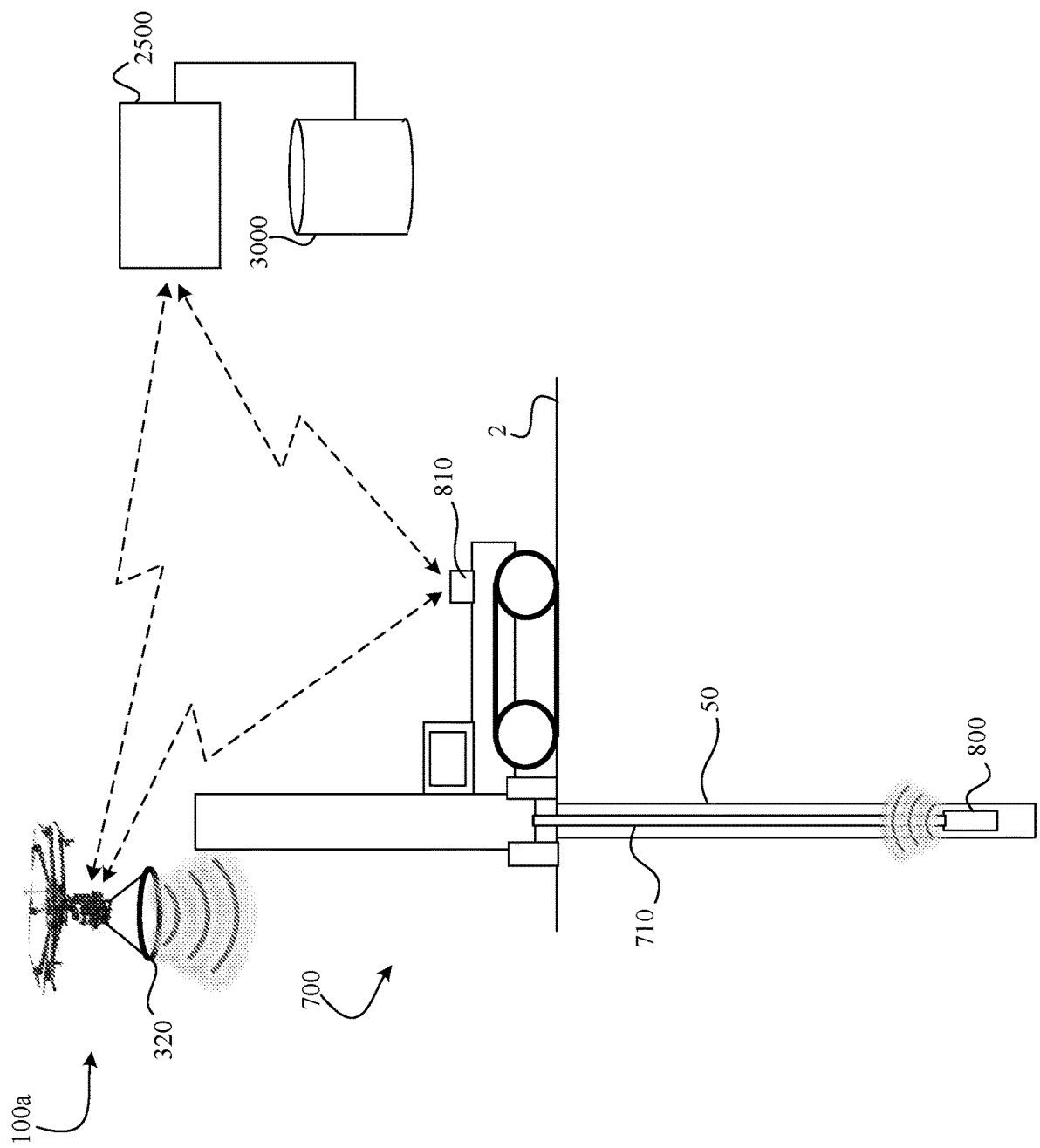
Figure 2B:
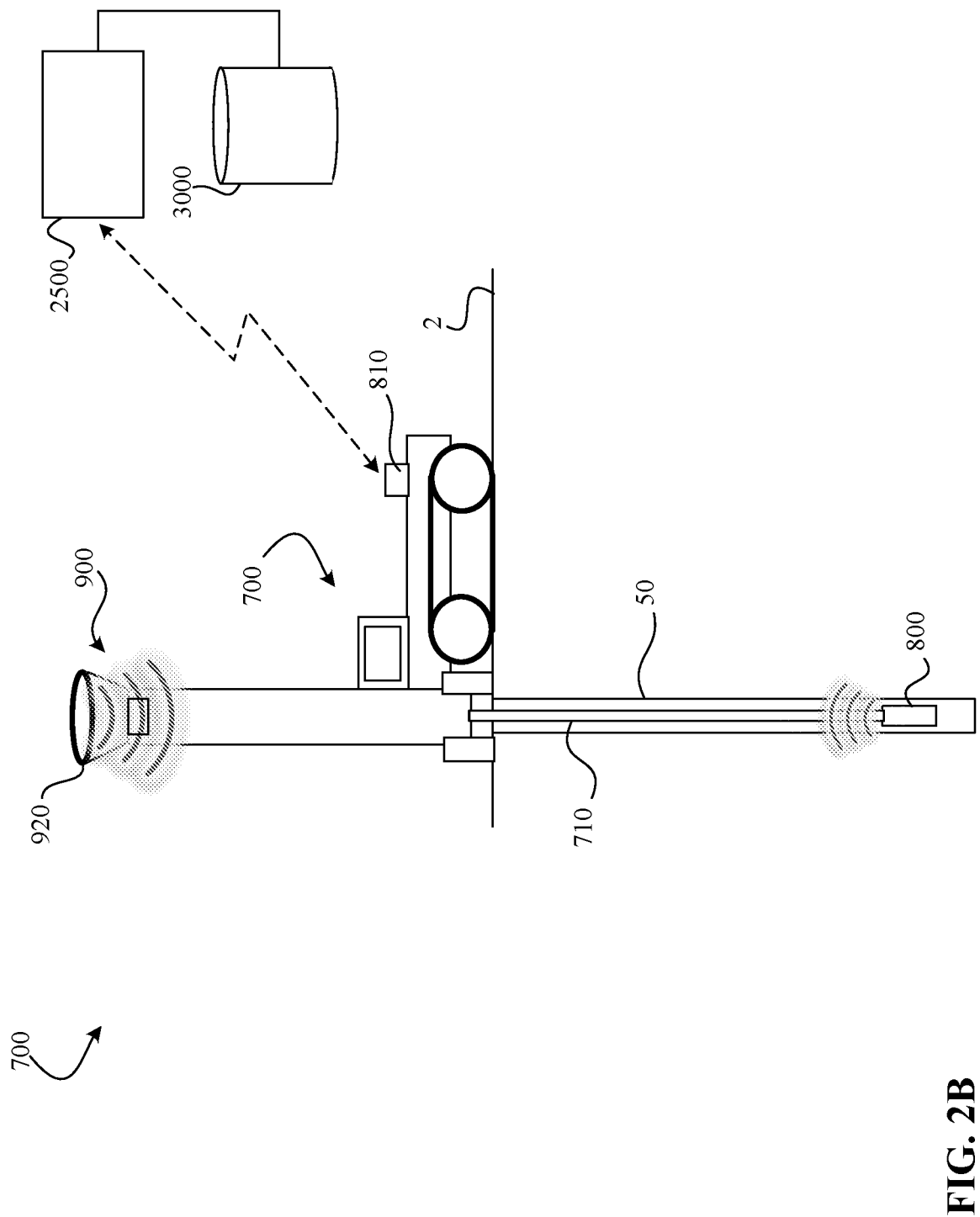

Aspects of Particular Non-Limiting Representative Commercial Blasting Systems FIGS. 1A-1L as well as associated FIGS. 2A-2B show particular aspects of commercial blasting systems 10 in accordance with a number of non-limiting representative embodiments of the present disclosure. As indicated in FIGS. 1A-1L, the system 10 provides one or more types of blast support vehicles 100 configured for MI based communication with wireless initiation devices 1000 deployable or deployed in association with a set of commercial blasting operations. In general, a blast support vehicle 100 typically includes a frame or body that carries a power or energy source, locomotion elements, a control unit, a vehicle-based MI based communication unit, and additional electronic elements not directed to or necessary for MI based communication, as further detailed below; and a wireless initiation device 1000 typically includes a housing or shell that carries a power source, a control unit, a device-based MI based communication unit, an initiation element (e.g., a detonator), and a main explosive charge, as also detailed below. Depending upon embodiment details, the blast support vehicles 100 can include or be airborne automated and/or autonomous vehicles 100a, such as remotely piloted aircraft (RPA) and/or autonomous airborne drones, such as shown in FIGS. 1A-1F and 1I-1K; and/or land based automated and/or autonomous vehicles 100b, such as remotely piloted terrestrial rovers (RPTRs) and/or autonomous land based drones, such as shown in FIGS. 1G-1H and 1L.

Such a system 10 can be configured/deployed for carrying out commercial blasting operations including underground mining, open cut mining, or quarrying operations, e.g., which can occur at a mine bench 2. In association with various types of commercial blasting operations, boreholes and/or blastholes 50 are drilled into and across portions of a geological formation, e.g., corresponding to or within the bench 2. For instance, one or more arrays of boreholes and/or blastholes 50 are drilled to extend into or through and across portions of the bench 2 in which a rock formation containing portions of an ore body to be mined reside. Such boreholes and/or blastholes 50 commonly have a length or depth that is between approximately 10-80 meters, e.g., between about 20-60 meters.

As indicated above, a borehole 50 can be categorized or defined as a hole formed or drilled into a portion of a geological formation, which does not or is not intended to contain explosive material(s), or which does not or is not intended to contain explosive material(s) and a set of initiation devices configured for the initiation and/or detonation thereof; and a blasthole 50 can be categorized or defined as a hole formed or drilled into a portion of a geological formation, which does or is intended to contain explosive material(s), or which does or is intended to contain explosive material(s) and a set of initiation devices configured for the initiation and/or detonation thereof. Thus, once a borehole 50 has been loaded with explosive material(s), or loaded with explosive material(s) and a set of initiation devices configured for the initiation and/or detonation thereof, the borehole 50 can be categorized or defined as a blasthole 50. Notwithstanding, for purpose of brevity and simplicity, in the description that follows, a blasthole 50, set of blastholes 50, or array of blastholes 50 can respectively be referred to as a borehole 50, set of boreholes 50, or array of boreholes 50.

The wireless initiation devices 1000 can be configured for deployment within the boreholes 50. For instance, each wireless initiation device 1000 can be configured for in-borehole deployment such that a lengthwise, longitudinal, or central axis 1001 of the wireless initiation device 1000 is intended to be aligned at least nearly coincident or parallel to a lengthwise, longitudinal, or central axis 51 of the borehole 50 in which it is deployed. Depending upon embodiment details and/or the nature of a set of commercial blasting operations under consideration, a single or multiple wireless initiation devices 1000 can be positioned in a given borehole 50. As a nonlimiting representative example, with respect to a particular borehole array, each of multiple wireless initiation devices 1000 along the length or depth of a given borehole 50 in the borehole array can be positioned within a particular blasting deck 52a-b of the borehole 50, where each blasting deck 52a-b contains an explosive material or substance 54 (e.g., an ammonium nitrate (AN) based explosive, such as an AN based emulsion explosive) and are typically separated by stemming material 56. For purpose of simplicity, FIGS. 1B-1J show two blasting decks 52a,b; however, individuals having ordinary skill in the relevant art will recognize that a borehole array can contain more than two blasting decks 52,a.b.

Different blasting decks 52a-b can be explosively initiated at different times. For instance, wireless initiation devices 1000 within and across a current exposed, outermost, or upper blasting deck 52a can be configured for initiation, or can be initiated, to blast the current exposed, outermost, or upper blasting deck 52a, while wireless initiation devices 1000 within and across one or more unexposed, inner, deeper, or lower blasting decks 52b can be slept. After broken rock has been cleared following the blasting of a most-recent blasting deck 52a, a subsequent exposed, outermost, or upper blasting deck 52b can be blasted, and so on, in a manner readily understood by individuals having ordinary skill in the relevant art. Each wireless initiation device 1000 can have, be assigned, or be programmed with a unique identifier (ID) stored in memory in the initiation device, e.g., in association with its manufacture, or after manufacture. Additionally or alternatively, particular groups of wireless initiation devices 1000 can have, be assigned, or be programmed with a unique group ID (GID) stored in the memory, e.g., prior to, in association with, or following deployment in a set of boreholes 50. For instance, for a borehole array having multiple blasting decks 52a,b therein, wireless initiation devices 1000 in a given blasting deck 52a can be programmed with a unique GID relative to wireless initiation devices 1000 in other blasting deck(s) 52b to facilitate the selective/selectable or sequenced activation and firing of the wireless initiation devices 1000 in the given blasting deck 52a relative to the wireless initiation devices 1000 in the other blasting deck(s) 52b.

As further detailed below, each blast support vehicle 100 includes an MI communication unit configured for sub-surface and/or TTE MI based communication, which can also be referred to as a MI based TTE communication unit, having a vehicle-based MI signal source that includes a set of coil antennas 320 and a vehicle-based MI signal receiver that includes a set of vehicle-based magnetometers; and analogously, each wireless initiation device 1000 includes an MI communication unit configured for sub-surface and/or TTE MI based communication, which can correspondingly be referred to as an MI based TTE communication unit, having device-based MI signal source that includes a set of coil antennas, and device-based MI signal receiver that includes a set of device-based magnetometers, such that MI based communication between blast support vehicles 100 and wireless initiation devices 1000 can occur. In various embodiments MI based communication between blast support vehicles 100 and wireless initiation devices 1000 is bidirectional. Hence, the MI communication unit of a blast support vehicle 100 can also be referred to as an MI based communication transceiver; and the MI communication unit of a wireless initiation device 1000 can correspondingly be referred to as an MI based communication transceiver. The particular manner(s) in which the MI communication units of the blast support vehicles 100 and the particular manner (s) in which the MI communication units of the wireless initiation devices 1000 are configured relative to each other for supporting or enabling reliable or generally reliable MI based communication, such as bidirectional MI based communication, between the blast support vehicles 100 and the wireless initiation devices 1000 can depend upon embodiment details, the orientation of the blast support vehicle's MI communication unit relative to the wireless initiation device's MI communication unit, the type of commercial blasting operation under consideration, and/or an environment in which the commercial blasting operation occurs.

As indicated in FIGS. 1B-1J, a blast support vehicle 100 can be positioned such that its MI source 320 resides over or in proximity to the collars or upper/top/previously or currently exposed openings of one or more boreholes 50 in which a set of wireless initiation devices 1000 resides, such that bidirectional MI based communication between the blast support vehicle 100 and particular wireless initiation devices 1000 within the set of wireless initiation devices 1000 that are within MI communication range of the blast support vehicle's MI signal source 320 can occur. The likelihood that a particular set of wireless initiation devices 1000 falls within reliable bidirectional MI communication range of a blast support vehicle 100 can depend upon multiple factors, including the configuration and orientation of the blast support vehicle's MI signal source(s) and the magnetic field distribution generated thereby relative to each wireless initiation device's magnetometer(s); the configuration and orientation of each wireless initiation device's MI signal source(s) and the magnetic field distribution generated thereby relative to the blast support vehicle's magnetometer(s); the magnitude of induced and/or environmental magnetic field noise, e.g., magnetic field noise having an MI signal frequency or a harmonic thereof corresponding to or overlapping with an MI signal frequency employed for MI based communication between the blast support vehicle(s) 100 and the set of wireless initiation devices 1000; and/or the magnetic properties of the physical medium in which the borehole-resident wireless initiation devices 1000 reside.

Blast support vehicles 100 are reusable in that they can be used in multiple or many commercial blasting operations over time. In contrast, following their explosive initiation, the wireless initiation devices 1000 are destroyed during the commercial blasting operation, and thus they are disposable or single-use devices. Because they are single use devices, and also because of the aforementioned shape/geometry and size constraints, the MI based communication units of the wireless initiation devices 1000 typically carry smaller, simpler, and less costly componentry than the MI based communication units of the blast support vehicles 100. Additionally, in view of electrical charge storage capacity constraints, the MI signal sources carried by the wireless initiation devices 1000 typically output weaker or significantly weaker MI communication signals than the MI communication signals output by the MI signal sources 320 carried by the blast support vehicles 100. In several embodiments, the MI based communication units of the blast support vehicles 100 utilize additional, higher powered, more complex, more capable/adjustable/adaptable, larger, and/or more costly componentry than the componentry in the wireless initiation devices' MI based communication units to aid reliable MI based communication, including reliable detection and decoding of the weaker MI communication signals generated by the wireless initiation devices 1000.

For instance, in some embodiments blast support vehicles 100 include 3-axis magnetometers configured for detecting magnetic flux in 3 mutually orthogonal axes, whereas each wireless initiation device 1000 carries a single axis magnetometer, e.g., which is aligned for detecting magnetic flux parallel to the lengthwise, longitudinal, or central axis 1001 of the wireless initiation device 1000, or perpendicular to the lengthwise, longitudinal, or central axis of the wireless initiation device 1000 depending upon whether the blast support vehicles MI sources 320 are configured for generating a magnetic field distribution having a maximum magnetic field intensity aligned approximately parallel or perpendicular to the lengthwise, longitudinal, or central axis 51 of the borehole 50 in which it resides. However, in other embodiments, a blast support vehicle 100 carries a single axis magnetometer that is intended or expected to be cooperatively aligned or generally cooperatively aligned with respect to the magnetic flux generated by the MI signal source(s) of the wireless initiation device(s) 1000 in a given borehole 50 when the blast support vehicle 100 is over, proximate to, or near the collar or opening of the borehole 50 in which the wireless initiation device(s) 1000 reside, e.g., cooperatively aligned relative to an expected magnetic flux maximum corresponding to the magnetic field distribution produced by each wireless initiation device's MI signal source, thereby enhancing or maximizing MI signal source-magnetometer magnetic flux coupling. Such cooperative alignment can be facilitated or occur, for instance, by way of an MI signal source having a central axis that is approximately parallel to or coincident with the lengthwise, longitudinal, or central axis of a borehole 50; or an MI signal source having a central axis that is approximately perpendicular to the lengthwise, longitudinal, or central axis of the borehole 50.

In certain embodiments, a blast support vehicle 100 can be parked such that its vehicle-based MI signal receiver and MI signal source 320 are directly over/above the collar or opening of a particular borehole 50 (e.g., the upper/top/ previously or currently exposed opening thereof), or between the collars or openings of a group of boreholes 50 (e.g., approximately midway between the collars or openings of 2 boreholes 50; or approximately equidistant between the collars of 4 boreholes 50; or over a central borehole 50 within a rectangular or square array of 9 boreholes). The blast support vehicle 100 can be temporarily transitioned to a quiescent state in which its locomotion elements as well as electronic circuitry that is non-essential with respect to MI based communication with the wireless initiation device(s) 1000 in the borehole 50 are off or in a low/very low power standby state in order to minimize induced magnetic field noise, thereby also aiding reliable MI based communication between the blast support vehicle 100 and in-borehole wireless initiation devices 1000 within communication range of the parked blast support vehicle's MI signal source 320. For an airborne blast support vehicle 100a, this involves landing the airborne blast support vehicle 100a such that its MI signal source 320 is appropriately positioned with respect to the borehole collar(s) or opening(s) under consideration; and for a land based blast support vehicle 100b, this involves parking the land based blast support vehicle 100b such that its MI signal source 320 is correspondingly positioned.

In several embodiments, a blast support vehicle 100 can measure and compensate for magnetic field noise corresponding to or falling within one or more frequency bands, thereby further enhancing MI communication reliability with wireless initiation devices 1000. More particularly, a blast support vehicle's set of magnetometers can be configured for measuring magnetic field noise in one or more frequency bands, which can correspond to or be correlated with a combination of background magnetic field noise plus induced magnetic field noise generated by the blast support vehicle's locomotion elements and electronics elements themselves. Depending upon embodiment details, the magnetometer(s) utilized for measuring magnetic field noise can be the same as or different than the magnetometer(s) utilized for MI based communication with wireless initiation devices 1000. For instance, the same set of magnetometers used for MI based communication with wireless initiation devices 1000 can measure magnetic field noise while the blast support vehicle 100 is not engaging in MI based communication with wireless initiation devices 1000. When engaging in MI based communication with wireless initiation devices 1000, the blast support vehicle's control unit can compensate for (e.g., subtract) a previously or most-recently measured magnetic field noise signal from the MI signals detected by the set of magnetometers. Alternatively, a first set of magnetometers can be used for MI based communication with wireless initiation devices 100; and a distinct second set of magnetometers can be used for measuring magnetic field noise. The blast support vehicle's control unit can compensate for (e.g., subtract) a measured magnetic field noise signal detected by the second set of magnetometers from an MI communication signal detected by the first set of magnetometers, in a manner analogous to that described above.

As indicated in FIGS. 1B, the system 10 can additionally include one or more background noise measurement units 400 that are separate from the blast support vehicles 100, and which are configured for measuring or monitoring background magnetic field noise in a commercial blasting environment. A given background noise measurement unit 400 includes a power source, a control unit, a set of noise-detection magnetometers, and a communication unit, which depending upon embodiment details can include or be a through-the-air (TTA) wireless communication unit and/or an MI based communication unit. A background noise measurement unit 400 can be carried by a background noise measurement vehicle 500, which can be defined as a type of auxiliary blast support vehicle; or it can be supported by or mounted on a frame or housing that remains stationary at a predetermined position proximate to or within the portion of the physical media intended to be blasted, e.g., on the bench 2, in the absence of manual intervention to place it elsewhere. A background noise measurement unit 400 can be configured for communicating measured background magnetic field noise signals or signal parameters corresponding thereto to a blast support vehicle 100, the control unit of which can be configured for compensating for (e.g., subtracting) the measured or estimated background magnetic field noise signals from MI communication signals detected by the blast support vehicle's set of magnetometers for purpose of aiding reliable MI based communication between the blast support vehicle 100 and wireless initiation devices 1000.

It can be noted that a background noise measurement unit 400 can additionally be configured as an MI signal survey device by way of measuring downlink MI communication signal strength when in MI based communication with a blast support vehicle 100. Thus, a background noise measurement vehicle's background noise measurement unit 400 can be configured to measure downlink MI communication signal strength when in communication with blast support vehicles 100, such that the background noise measurement vehicle 500 can also function as a type of MI signal survey unit (in the vehicle) with respect to various locations or positions, e.g., multiple locations on or across the bench 2. The vehicle-based MI communication signal survey unit can communicate a plurality of measured MI signal strengths or parameters corresponding thereto associated with the locations (represented by coordinates in a global coordinate system, e.g., Global Navigation Satellite System (GNSS) coordinates) of different boreholes 50 to one or more blast support vehicles 100 and/or a database, e.g., a remote database 3000 associated with or coupled to a blast modelling/planning system 2500, for subsequent access, retrieval, and possible use during bidirectional MI based communication between blast support vehicles 100 and the wireless initiation devices 1000 in association with a commercial blasting operation under consideration.

Individuals having ordinary skill in the art will understand that one or more boreholes 50 may not be perfectly vertical. Rather, as indicated in FIG. 1C, a given borehole be formed or drilled such that a lengthwise, longitudinal, or central axis 51 of the borehole 50 forms a small or generally small non-perpendicular angle (e.g., up to approximately 5-7 degrees) with respect to a plane corresponding to the outer surface of the bench 2 in which the boreholes 50 reside. Moreover, as also indicated in FIG. 1C, such individuals will understand that a particular wireless initiation device 1000 when deployed or loaded into a specific borehole 50 may be positioned such that a lengthwise, longitudinal, or central axis 1001 of the wireless initiation device 1000 forms a non-perpendicular angle (e.g., up to approximately 15-30 degrees) with respect to the lengthwise, longitudinal, or central axis 51 of the borehole 50. Such angular or axial (mis)alignments of boreholes 50 relative to the outer surface of the bench 2 and/or angular or axial (mis)alignments of wireless initiation devices 1000 disposed within the boreholes 50 can adversely affect the reliability or consistency of MI based communication between blast support vehicles 100 and the wireless initiation devices 1000 deployed in the boreholes 50.

In some embodiments, a blast support vehicle 100 can carry one or more MI communication orientation adjustment units by which the spatial orientation of the blast support vehicle's MI signal source 320 and/or set of magnetometers can be adjusted in 1, 2 or 3 mutual orthogonal angular directions to enhance or maximize MI communication signal strength between the blast support vehicle 100 and the wireless blasting-related devices (e.g., initiation device(s) 1000) disposed in each borehole 50, e.g., in a manner indicated or analogous to that shown in FIG. 1C. Such MI communication orientation adjustment units can include or be, for instance, a gimbal or a plurality of individually actuatable arms (e.g., 3 individually extendable/retractable arms) configured for changing or modifying the spatial orientation of the blast support vehicle's MI signal source 320 and/or magnetometer(s); or a first gimbal or first plurality of individually actuatable arms configured for modifying the spatial orientation of the blast support vehicle's MI signal source 320, and a distinct second gimbal or second plurality of individually actuatable arms configured for altering the spatial orientation of the blast support vehicle's magnetometer(s). While FIG. 1C shows adjustment of an MI communication signal angle for an airborne blast support vehicle 100*a*, similar or analogous considerations apply to land based blast support vehicles 100*b*, in a manner that will be readily understood by individuals having ordinary skill in the relevant art.

After wireless initiation devices 1000 have been deployed in an array of boreholes 50, one or more blast support vehicles 100 can be positioned or parked over and/or can travel across each borehole 50, and can establish or attempt to establish bidirectional MI based communication with the wireless initiation devices 1000 at different MI signal orientation angles in order to determine, for each wireless initiation device 1000, and/or for the wireless initiation devices 1000 in a given borehole 50, and/or for a plurality of wireless initiation devices 1000 in a group of boreholes 50, an MI signal orientation angle that enhances or maximizes MI signal strength and MI based communication reliability between the blast support vehicle(s) 100 and the wireless initiation device(s) 1000 under consideration. MI signal orientation angles corresponding to individual wireless initiation devices 1000, groups of wireless initiation devices 1000, individual boreholes 50, and/or particular groups of boreholes 50 can be communicated to and stored in a database, e.g., a remote database 3000 associated with or coupled to a blast modelling/planning system 2500, for subsequent access, retrieval, and possible use during bidirectional MI based communication between blast support vehicles 100 and the wireless initiation devices 1000 in association with a commercial blasting operation under consideration.

Reliable MI signal communication between blast support vehicles 100 and wireless initiation devices 1000 can also be aided by appropriate MI communication signal frequency band or frequency tuning, e.g., at least MI signal frequency band or frequency tuning by the blast support vehicle(s) 100, and possibly also by the wireless initiation devices 1000. MI communication signal frequency band or frequency tuning may be beneficial or required in view of magnetic field noise, and/or because the physical composition of one or more media in which wireless initiation devices 1000 are deployed may adversely affect MI signal strength at one or more MI signal frequencies. In multiple embodiments, self-tuning can occur by way of current sense circuitry configured for monitoring the electrical current consumption of MI signal output or transmission circuitry, given that at peak resonance the electrical current drawn is or is expected to be highest.

MI based communication reliability or consistency can be further enhanced in a number of embodiments by way of wireless initiation devices 1000 that are configured for establishing one or more ad-hoc MI based communication networks among or between each other. For instance, as shown in FIG. 1D, at least some or each of a plurality of wireless initiation devices 1000 deployed in an array of boreholes 50 can include MI based communication units and associated control units by which a given wireless initiation device 1000 can establish MI based communication (e.g., MI based cross-communication) with one or more nearby, nearest neighbour, and/or adjacent wireless initiation devices deployed within and/or across the array of boreholes 50, thereby forming an ad-hoc MI based communication network that includes the plurality of wireless initiation devices 1000, and which can further include a blast support vehicle 100 exchanging MI communication signals with at least one wireless initiation device 1000 within this plurality of wireless initiation devices 1000. MI communication signals generated by the blast support vehicle 100 can be detected and decoded by one or more wireless initiation devices 1000 in the ad-hoc MI based communication network, and transferred or relayed among or between such wireless initiation devices 1000; and MI communication signals generated by a given wireless initiation device 1000 corresponding to the ad-hoc MI based communication network can be transferred or relayed among or between at least some other wireless initiation devices 1000 in the boreholes 50 and communicated to the blast support vehicle 100. In certain embodiments, the formation of an ad-hoc MI based communication network can be automatically triggered by way of an appropriate command encoded in an MI communication signal output by the blast support vehicle 100, which is received and processed by one or more of the wireless initiation devices 1000 within the plurality of wireless initiation devices 1000 to establish the ad-hoc MI based communication network.

In view of the foregoing, in multiple embodiments as indicated in FIG. 1B-1D and FIGS. 1I-1J, while a particular airborne blast support vehicle 100*a* has landed over, hovers over, or flies over/across a given borehole 50 in which a set of wireless initiation devices 1000 reside, the set of wireless initiation devices 1000 will be within reliable MI communication range of the airborne blast support vehicle 100*a* under consideration. Additionally, in at least some embodiments as indicated in FIGS. 1E-1F, while a specific airborne blast support vehicle 100*a* has landed over, hovers over, or flies over, across, or between a plurality of boreholes 50, e.g., a pair of boreholes 50, a plurality or group of wireless initiation devices 1000 disposed in the plurality of boreholes 50 resides within reliable MI communication range of this airborne blast support vehicle 100*a*. Similarly, as indicated in FIGS. 1G, when a particular land based blast support vehicle 100*b* is parked over or travels over/across a given borehole 50 in which a set of wireless initiation devices 1000 reside, e.g., a plurality or group of wireless initiation devices 1000, the set of wireless initiation devices 1000 will be within reliable MI communication range of the land based blast support vehicle 100*b* under consideration. Additionally, in at least some embodiments as indicated in FIG. 1H, while a specific land based blast support vehicle 100*b* is parked over or driven over, across, or between a plurality of boreholes 50, e.g., a pair of boreholes 50, a plurality or group of wireless initiation devices 1000 disposed in the plurality of boreholes 50 resides within reliable MI communication range of this land based blast support vehicle 100*b*.

As indicated in FIGS. 1B-1D and 1G-1J, blast support vehicles 100 are also configured for wireless communication with a remotely located or distant blast control apparatus/system 2000; and/or as indicated in FIGS. 1E-1F, wireless communication with a communication hub, node, or hotspot 2002 associated with the remotely located blast control apparatus/system 2000. With respect to controlling the execution of a given blast or blast sequence, the blast control apparatus/system 2000 can be in communication with or operated by an appropriately authorized shot firer, in a manner readily understood by individuals having ordinary skill in the relevant art.

In various embodiments, communication between blast support vehicles 100 and the blast control apparatus/system 2000 can occur by way of conventional communication modes, networks, infrastructure, and/or devices. In multiple embodiments, such communication includes or is Through the Air (TTA) wireless communication, which involves or is based on the modulated generation and wireless reception or detection of propagating electromagnetic waves rather than the modulated generation and near-field detection of a quasi-static magnetic field. Depending upon embodiment details, TTA wireless communication between blast support vehicles 100 and the blast control apparatus/system 2000 or an associated communication hub, node, or hotspot 2002 can occur by way of one or more communication networks 20 such as a set of WiFi networks, cellular communication networks, and/or satellite communication networks. In view of the foregoing, at least some blast support vehicles 100 include a TTA communication unit providing a set of antennas by which TTA wireless communication between the blast support vehicles 100 and the blast control apparatus/system 2000 can occur. In certain embodiments, the blast control apparatus/system 2000 is coupled to an associated hotspot 2002 by way of the Internet, in which case the blast control apparatus/system 2000 can be located far or very far away (e.g., several, tens, hundreds, or possibly thousands of kilometres) from the wireless initiation devices 1000 with which the blast support vehicles 100 communicate during a current commercial blasting operation under consideration.

In some embodiments, wireless initiation device functions or operations including wireless initiation device wake up, MI communication signal strength testing, ID verification, GID verification, (re)programming, arming, synchronization, and initiation or firing are triggered or executed in response to MI based communication between blast support vehicles 100 and wireless initiation devices 1000. In association with or as part of wireless initiation device ID verification, a blast support vehicle 100 can communicate with a blast control apparatus/system 2000, a blast modelling/planning system 2500, and/or a remote database 3000 associated therewith to verify whether the correct wireless initiation device(s) 1000 reside in the correct or intended borehole(s) 50, or whether one or more wireless initiation devices 1000 that should reside in particular borehole(s) 50 are non-responsive/dysfunctional or possibly missing according to data from the blast control apparatus/system.

Because the firing of particular or particular groups of wireless initiation devices 1000 may need to be performed at precisely coordinated times or time intervals relative to each other in order to achieve or maximize the likelihood of achieving an intended blast or blast sequence outcome, in some embodiments wireless initiation devices 1000 that will be fired as part of a blast or blast sequence can be synchronized to a master clock unit corresponding to or carried by a blast support vehicle 100 by way of MI based communication between the blast support vehicle 100 and the wireless initiation devices 1000 involved in the blast or blast sequence. With respect to the synchronization of wireless initiation devices 1000 in an ad-hoc network by way of a set of blast support vehicles 100, one blast support vehicle 100 maintains a master clock, which serves as an absolute time reference for a plurality of other blast support vehicles in the system. This blast support vehicle 100 can be referred to as a master blast support vehicle 100. Prior to or in association with wireless initiation device arming by the blast support vehicle(s) 100, a current absolute time can be communicated from the master blast support vehicle 100 to one or more wireless initiation devices 1000 in the ad-hoc network. With reference to the time required for communicating and decoding the current absolute time to a given wireless initiation device 1000, the wireless initiation device 1000 can update its local clock to an updated current absolute time, e.g., the most-recently received absolute time plus a time offset or time delay.

In other embodiments, blast support vehicles 100 are not configured for or are precluded or prevented from directly triggering or performing certain wireless initiation device functions or operations, including wireless initiation device arming and firing. Rather, such wireless initiation device functions or operations can be triggered or executed by way of transferring an appropriate arming or firing signal or command from the blast control apparatus/system 2000 to the wireless initiation devices 1000 that will be involved in a blast or blast sequence, without transferring or routing the firing signal or command through blast support vehicles 100 to the wireless initiation devices 1000. More particularly, as indicated in FIGS. 1F and 1H, in some embodiments, the blast control apparatus/system 2000 is configured for controlling a large/high power MI signal source 2200 (also referred to as a "broadcast MI signal source" or "broadcast signal source") that includes a current driver 2210 providing MI signal modulation circuitry, and a large loop antenna 2220 that can be driven by the current driver 2210. The large/high power MI signal source 2200 is located distant or remote from the wireless initiation devices 1000 that will be involved in the blast or blast sequence, e.g., at least approximately 100 meters, or approximately 100-500 meters or more from such wireless initiation devices 1000, and is configured for generating or outputting MI communication signals having sufficient strength to be received by the wireless initiation devices 1000 that will be initiated during the blast or blast sequence. Moreover, prior to the issuance of a firing signal or command, the blast control apparatus/system 2000 can output, issue, or broadcast a synchronization signal, optionally including device IDs and/or GIDs, that can be received and processed by each of the wireless initiation devices 1000 that will be involved in the blast or blast sequence. Such group-wise or collective wireless initiation device synchronization can occur by way of the large loop antenna 2220, even in embodiments in which blast support vehicles 100 are configured or enabled for triggering wireless initiation device firing, thereby aiding or enhancing synchronization precision. The precise synchronization of an ad-hoc network of wireless initiation devices 1000 can also be aided by way of the communication of a synchronization signal from the large loop antenna 2220 to the wireless initiation devices 1000 in the ad-hoc network.

As indicated in FIG. 1I, the system 10 can further include a set of auxiliary blast support vehicles in the form of wireless communication intermediaries or wireless communication routing/repeater vehicles 600 disposed between the blast support vehicles 100 and the blast control apparatus/system 2000 or an associated communication hub, node, or hotspot 2002. Such wireless communication routing/repeater vehicles 600 are typically configured as TTA wireless communication signal routers/repeaters, and can enhance or maximize the likelihood of reliable wireless communication between the blast control system 2000 and in-field blast support vehicles 100 (e.g., blast support vehicles 100 deployed for communicating with wireless initiation devices 1000 located at a mine site, such as on-bench at an open cut mine, in association with a commercial blasting operation currently under consideration). A TTA wireless communication signal router/repeater 600 can be defined as a type of auxiliary blast support vehicle.

As indicated in FIG. 1J, the system 10 can also include a plurality of blast monitoring/tracking devices 1600 configured to reside in particular boreholes 50 in which wireless initiation devices 1000 reside, and/or auxiliary boreholes 60 located proximate to the boreholes 50 in which wireless initiation devices 1000 reside. Moreover, as also indicated in FIG. 1J, in certain embodiments, a blast monitoring/tracking device 1600 can be coupled or attached to a wireless initiation device 1000 deployed in a borehole 50. In still other embodiments, a blast monitoring/tracking device 1600 can be integrated into a wireless initiation device 1000 device such that the marker and the initiation device are both within the housing. In some embodiments, an integrated blast monitoring/tracking and wireless initiation device can utilize different MI signal frequency bands or frequencies for MI based position localization and MI based communication respectively, and can include different selectable MI signal tuning circuit elements (e.g., including different capacitors, which can be relay switched) that can be selectively activated for establishing a particular operating frequency band or frequency.

The auxiliary boreholes 60 can be drilled to reside between particular boreholes 50, and/or along an ore-waste rock boundary, e.g., on the bench 2. For instance, as additionally indicated in FIG. 1K, portions of a geological formation to be mined, e.g., corresponding to a bench 2, can have drilled therein an array of boreholes 50, which can be referred to as main boreholes 50, and a plurality of ore-waste rock boundary boreholes 60. The auxiliary boreholes 60 need not be the same length or depth as the main boreholes 50, e.g., the auxiliary boreholes 60 can be shorter than the main boreholes 50, although some of the auxiliary boreholes 60 can be the same length as or longer than the main boreholes 50. The main boreholes 50 can be loaded with explosive material(s) 54 and wireless initiation devices 1000, plus stemming material 56, e.g., in a manner indicated above; and the ore-waste rock boundary boreholes 60 can be loaded with blast monitoring/tracking devices 1600 surrounded by stemming material 56. That is, the auxiliary boreholes 60 exclude wireless initiation devices 1000, and are not loaded with explosive material(s) 54.

A blast monitoring/tracking device 1600 typically includes a robust or highly robust housing configured for surviving a blast or blast sequence. The housing can carry or contain a set of structures, elements, or devices having known magnetic properties detectable by blast support vehicles 100; and/or the housing can carry or contain at least some of a power source; a control unit; an MI based communication unit by which MI based communication with blast support vehicles 100 can occur; and possibly a set of sensors configured for sensing particular selected environmental conditions or parameters, including temperature, moisture, pressure, and/or shock, e.g., including when the blast monitoring/tracking device 1600 is deployed in-hole. Each blast monitoring/tracking device 1600 can be assigned or programmed with its own unique ID, and in some embodiments particular selected groups of blast monitoring/tracking devices 1600 can be assigned or programmed with a unique GID for that group, e.g., where different GIDs can indicate different regions, zones, or areas, such as different ore-waste rock border regions, zones, or areas, in which particular groups of blast monitoring/tracking devices 1600 reside.

One or more blast support vehicles 100, e.g., a set of airborne blast support vehicles 100*a*, can scan the bench 2, and can estimate or determine a current position or location for each blast monitoring/tracking device 1600, such as by way of a magnetic field localization technique, for instance, similar, analogous, or essentially identical to that described in Patent Cooperation Treaty (PCT) publication number WO2015143500, which is hereby incorporated herein by reference in its entirety. Thus, prior to the execution of a blast or blast sequence, the blast support vehicle(s) 100 can confirm the physical locations of the blast monitoring/tracking devices 1600 in the main boreholes 50 and/or auxiliary boreholes 60; and after the execution of a blast or blast sequence, the blast support vehicle(s) 100 can scan the post-blast broken rock, which has been fractured and heaved. Depending upon the manner in which the blast monitoring/tracking devices 1600 are implemented, one or more blast monitoring/tracking devices 1600 can act as magnetic beacons having known magnetic characteristics, which the blast support vehicle(s) 100 can detect and localize without requiring the prior establishment of MI based communication with such blast monitoring/tracking devices 1600; and/or the blast support vehicle(s) 100 can establish MI based communication with at least some of the blast monitoring/tracking devices 1600 and determine the post-blast physical locations of such blast monitoring/tracking devices 1600. The post-blast locations of the blast monitoring/tracking devices 1600 can indicate or be correlated with a likelihood that an intended blast outcome has been achieved, and/or a post-blast ore-waste rock boundary, i.e., a shifted/translated/displaced ore-waste rock boundary relative to the original or pre-blast ore-waste rock boundary, e.g., which can be used for (a) confirming whether an intended blast or blast sequence outcome has occurred; as well as (b) aiding digging or excavation equipment in the preferential or targeted removal of rock containing ore relative to waste rock, such that ore-bearing rock can be efficiently removed and sent for processing.

It can be noted that in some embodiments, the localization of blast monitoring/tracking devices 1600 by blast support vehicles 100 can be performed at a first MI signal frequency, e.g., in the VLF band; and communication (e.g., data communication) between blast monitoring/tracking devices 1600 and blast support vehicles 100 can occur at a second MI signal frequency, e.g., in the LF band. Thus, the first MI signal frequency used for localization is typically lower than the second MI signal frequency used for communication (e.g., data communication). As a representative example, in particular embodiments blast monitoring/tracking device localization can occur at a first MI signal frequency between approximately 5 Hz-5 kHz; and blast monitoring/tracking device data communication can occur at a higher second MI signal frequency between approximately 35 Hz-35 kHz. Individuals having ordinary skill in the relevant art will understand that lower MI signal frequencies typically experience less distortion due to variations in medium composition/rock formation or ground characteristics; and higher MI signal frequencies can result in improved received MI signal strength as well as higher data rate.

In addition to the foregoing, in some embodiments one or more airborne blast support vehicles 100*a* carry particular types of imaging apparatuses or devices configured for capturing pre-blast, in-blast, and/or post-blast images and/or videos for aiding automated analysis of pre-blast, in-blast, and/or post-blast conditions, e.g., such that one or more properties, characteristics, and/or boundaries of post-blast broken/fractured rock can be estimated or determined. Such imaging apparatuses or devices can include high speed cameras configurable or configured for capturing visible/visual wavelength band or infrared wavelength band images and/or videos before, during, and after a blast; and/or a hyperspectral imaging device configured for capturing images and/or videos before, during, and after a blast. Such imaging apparatuses or devices facilitate or enable dynamic blast event monitoring/recording, and subsequent blast event analysis, e.g., artificial intelligence based blast event analysis.

The composition of and/or compositional variations in one or more physical media disposed between wireless initiation devices 1000 and blast support vehicles 100, e.g., a set of physical media corresponding to or forming portions of a geological formation in which wireless initiation devices 1000 have been deployed, can affect MI signal strength, MI based communication reliability, and/or the likelihood that MI based communication can successfully occur at one or more MI signal frequencies. Compositional variations in one or more physical media in which wireless initiation devices 1000 reside can occur along multiple directions, e.g., into the depth of and/or across the lateral extent of portions of a geological formation. For instance, compositional variations in a geological formation can occur along the depth or length of one or more boreholes 50, and/or from or between a first set of boreholes 50 to a distinct second set of boreholes 50.

MI signal survey devices, or MI signal survey vehicles carrying such devices, can be configured to measure MI based communication signal strength for one or more MI signal frequencies at one or more depths (e.g., multiple or many depths) along the lengths of at least some boreholes 50, e.g., an array of boreholes 50, in which wireless initiation devices 1000 reside. Such measurement of MI based communication signal strength(s) typically involves at least the measurement of uplink MI communication signal strength at one or more frequencies for one or more positions or depths along one or more boreholes 50, and can further involve the measurement of downlink MI communication signal strength at one or more frequencies for one or more positions or depths along one or more boreholes 50. The measured signal strength(s) can include measurements for a plurality of hole depths and for a plurality of frequencies at each depth.

The blast support vehicle can be in the form of a borehole drill rig that includes the survey device. Further to the foregoing, FIG. 2A illustrates a borehole drill rig 700 configurable or configured as an MI signal survey vehicle in accordance with an embodiment of the present disclosure. The borehole drill rig 700 provides the extendable apparatus in the form of a shaft 710 that is extendable into and selectively/selectably positionable along the depth or length of a borehole 50, e.g., as part of borehole drilling or after borehole drilling, which carries the survey device in the form of an MI based communication unit 800 at a predetermined position therealong, e.g., near or at a distal end thereof. The MI based communication unit 800 includes at least a set of magnetic signal sources (e.g., one or more coil antennas), and typically also includes a set of magnetometers. The borehole drill rig 700 also includes an MI signal survey controller 810 coupled to the MI based communication unit 800, which includes a power source, one or more processing units, a memory, MI based communication control circuitry, and possibly TTA communication circuitry. During an MI signal survey, the MI signal survey controller 810 controls the operation of the MI based communication unit 800 in association with monitoring, estimating, or determining a current position or depth of the MI based communication unit 800 in the borehole 50. More particularly, during an MI signal survey, the MI signal survey controller 810 controller 810 can control the MI based communication unit 800 to generate or output uplink MI communication signals at one or more MI signal frequencies at one or more times while the MI based communication unit 800 is disposed at one or more positions or depths along the borehole 50. In association with such generation of uplink MI communication signals, a blast support vehicle 100, such as an airborne blast support vehicle 100a, can be positioned above the drill rig 700. The MI signal survey controller 810 can further be configured for TTA wireless communication with the blast support vehicle 100, such that the blast support vehicle's detection or attempted detection of uplink MI signals can be coordinated with the operation of the MI based communication unit's generation of MI based communication signals under the direction or control of the MI signal survey controller 810. The blast support vehicle 100 can store or record the strengths of detected uplink MI communication signals. The blast support vehicle 100 can also be configured for TTA wireless communication with a blast modelling/planning system 2500 and/or a remote database 3000, and can communicate MI signal strength measurement results thereto, e.g., for subsequent retrieval and use in association with carrying out a commercial blasting operation under consideration.

In an analogous manner, the blast support vehicle 100 can generate downlink MI communication signals at one or more MI signal frequencies and/or one or more power levels at one or more times, while the in-hole MI based communication unit 800 cooperatively detects or attempts to detect the downlink MI communication signals at one or more positions or depths along the borehole 50. The MI signal survey controller 810 can operate in a coordinated manner with the blast support vehicle's generation of downlink MI communication signals, and can store or record the strengths of detected downlink MI communication signals. The MI signal survey controller 810 can be configured for TTA wireless communication with the blast modelling/planning system 2500 and/or a remote database 3000, and can communicate MI signal strength measurement results thereto, e.g., for subsequent retrieval and use in association with carrying out a commercial blasting operation under consideration.

FIG. 2B illustrates a borehole drill rig 700 configurable or configured as an MI signal survey vehicle in accordance with another embodiment of the present disclosure, in which the borehole drill rig 700 carries a first MI based communication unit 800 deployable in a borehole 50, and a second MI based communication unit 900 deployed or deployable near or at a top portion of a mast or tower structure of the drill rig 700. The second MI based communication unit 900 includes at least a set of MI signal sources (e.g., a set of coil antennas), and typically also includes a set of magnetometers. Each of the first and second MI based communication units 800, 900 operates under the direction or control of the MI signal survey controller 810. Hence, in the embodiment shown in FIG. 2B, the second MI based communication unit 900 effectively reduces, replaces, or eliminates the need for the blast support vehicle 100 such as shown in FIG. 2A for carrying out an MI signal survey.

By way of an MI signal survey conducted at one or multiple MI signal frequency bands or frequencies across some or each of multiple boreholes 50, e.g., an array of boreholes 50, possibly at multiple or many depths along the boreholes 50 under consideration, and the communication of MI signal strength measurement results communicated to a blast modelling/planning system 2500 or remote database 3000 in communication therewith, the blast modelling/planning system 2500 can generate a generally accurate, expected accurate, or accurate map of actual MI signal strengths and/or MI signal strength variations across the array of boreholes 500 with respect to one or more MI signal frequency bands or frequency. Such MI signal strengths or MI signal strength variations can be correlated with or correspond to actual compositional properties or changes in compositional properties in portions of one or more physical media such as portions of a geological formation that will be blasted by way of wireless initiation devices 1000 deployed in boreholes 50 drilled therein. The blast modelling/planning system 2500 can further select a most suitable or expected best MI signal frequency band in which and/or frequency at which blast support vehicles 100 will communicate with one or more wireless initiation devices 1000 in association with carrying out a commercial blasting operation under consideration. Such an MI signal frequency band or frequency can provide, for instance, a highest or best MI signal strength and/or signal to noise ratio (SNR) relative to other MI signal frequency bands or frequencies considered during the MI signal survey. In view of the foregoing, a system 10 in accordance with an embodiment of the present disclosure can automatically adapt to or adjust or compensate for differences in MI signal strengths across and/or within different portions, regions, volumes, or zones of one or more physical media in which wireless blasting-related devices, e.g., wireless initiation devices 1000 and/or blast monitoring/tracking devices 1600, are deployed, where such differences in MI signal strengths arise from the physical properties of one or more of such media. Stated in a corresponding or equivalent manner, a system 10 in accordance with an embodiment of the present disclosure can automatically adapt to or adjust or compensate for the effect(s) that compositional variations within and/or across portions of one or more physical media may have upon reliable MI based communication with wireless blasting-related devices deployed in such media.

It can be noted that blast support vehicles 100, e.g., airborne blast support vehicles 100*a* and/or land based blast support vehicles 100*b*, can additionally or alternatively be adapted to operate as or be configured for conducting MI signal surveys in one or more manners. For instance, a blast support vehicle 100 can be configured for (a) lowering a survey device (an MI communication unit) carried by the extendable apparatus (at a predetermined or selected position, e.g., the distal end) into and raising the survey device out of a borehole 50, e.g., by way of the system including an extendable apparatus (e.g., a winch and cable or extendable/collapsible shaft apparatus) carried by the blast support vehicle 100, in which the survey device is disposed or connected at a terminal end of the extendable apparatus; and (b) conducting MI signal surveys while the survey device is disposed in the borehole 50 by way of an on-board MI signal survey controller (which can simply be based on, correspond to, or utilize the blast support vehicle's standard MI based communication unit), e.g., in a manner analogous to that described above.

Additionally or alternatively, an MI signal survey can be conducted by way of a first blast support vehicle 100, e.g., which can be an airborne or land based blast support vehicle 100*a,b*, activating an MI signal source, and a separate second blast support vehicle 100, e.g., another airborne or land based blast support vehicle 100*a,b*, detecting or receiving the MI signal(s) output by the first blast support vehicle 100. This type of MI signal survey can be performed in a manner analogous to surface geophysical exploration techniques such as frequency domain electromagnetics (FDEM) or time domain electromagnetics (TDEM) geophysics techniques, in which a pair of coil antennas are separated from each other by a given distance, and are positioned at, just above, near, or above the surface of the earth.

While portions of the above description and the FIGs. corresponding thereto pertain to open cut mining environments, various embodiments of systems 10 in accordance with the present disclosure are deployable in or suitable for deployment in underground mining environments, e.g., underground mines employing underground mining practices or techniques such as but not limited to shaft sinking, sublevel caving, hangup blasting, block caving, rise mining, room and pillar mining, and/or other underground mining practices or techniques. For instance, FIG. 1L shows aspects of a system 10 in accordance with a representative non-limited embodiment of the present disclosure, which is deployed in an underground mining environment. In a manner analogous or essentially identical to that indicated above, wireless initiation devices 1000 (and/or other types of wireless blasting-related devices) having MI based communication units therein can be deployed in boreholes 50 in an underground mine. One or more blast support vehicles 100, e.g., airborne blast support vehicles 100*a* and/or land based blast support vehicles 100*b* having MI based communication units, can be deployed in the underground mine, and can be configured for bidirectional MI based communication with the wireless initiation devices 1000, e.g., on an individual or group basis.

It can be further noted that while the FIGs. accompanying this description illustrate a single blast support vehicle 100 or a pair of blast support vehicles 100, e.g., for purpose of simplicity and clarity, various embodiments of systems 10 in accordance with the present disclosure can be configured for operation with or can include more or many more blast support vehicles 100. More particularly, systems 10 in accordance with multiple embodiments of the present disclosure can be configured for operation with or can include one or more swarms of blast support vehicles 100, wherein for each swarm of blast support vehicles 100, multiple blast support vehicles 100 operate in parallel or simultaneously/concurrently with respect to the generation or output of MI signals directed to and/or the detection or reception of MI signals generated or output by one or more types of wireless blasting-related devices, e.g., wireless initiation devices 1000 and/or blast monitoring/tracking devices 1600. In such systems 10, a specific blast support vehicle 100, e.g., within a given swarm of blast support vehicles 100, can be configured for MI based communication with a certain number of wireless blasting-related devices, such as wireless initiation devices 1000 corresponding to particular IDs, or wireless initiation devices 1000 corresponding to a particular GID or set of GIDs, or wireless initiation devices 1000 deployed in boreholes 50 corresponding to particular borehole geolocations (e.g., as indicated by borehole GNSS coordinates). Individual blast support vehicles 100 within a given swarm of blast support vehicles 100 can be programmed, e.g., by way of a blast modelling/planning system 2500 and/or other type of computerized system, such that they travel along a particular path or route, e.g., an automatically selected/determined/optimized route, in association with undertaking MI based communication with particular wireless initiation devices 1000, and/or undertaking MI based localization and/or MI based communication with blast monitoring/tracking devices 1600 as part of carrying out a commercial blasting operation under consideration.

In view of the description herein and the FIGs. corresponding thereto:

(A) In an embodiment, a blast support vehicle 100 includes a frame or body, which carries or is coupled to a set of power sources, supplies, or reservoirs; a set of locomotion units configurable or configured for aerial and/or land based locomotion by which the blast support vehicle 100 can travel, and which can include one or more prime movers or motors coupled to a set of displaceable propulsion structures or elements such as rotors, wheels, treads, etc. configured for effectuating displacement of the blast support vehicle 100 through a physical environment; a control unit, which provides a set of processing units (e.g., which can include one or more microprocessors, microcontrollers, application specific integrated circuits (ASICs), Field Programmable Gate Arrays (FPGAs), programmable logic devices (PLDs), and/or other types of transistor-based circuitry configurable or configured for executing program instructions and/or implementing a finite state machine (FSM)), and a set of computer readable/electronically readable media (e.g., one or more memories); a TTA communication unit; an MI based communication unit providing modulation/encoding circuitry coupled to a set of MI signal sources (e.g., coil antennas) 320, and demodulation/decoding circuitry coupled to a set of magnetometers (e.g., which can include one or more of a Hall effect based magnetometer, a magnetoresistive based magnetometer, a conducting coil based magnetometer, and/or another type of magnetometer such as a fluxgate magnetometer) corresponding to one or more orthogonal spatial directions or axes; possibly an MI communication orientation adjustment unit configured for adjusting the spatial orientation of the set of MI signal sources 320 and/or the set of magnetometers; and possibly or typically an imaging or image capture unit, e.g., which can include one or more types of image capture devices or cameras, such as a conventional video camera, one or more types of high speed video cameras (e.g., configured for high speed image/video capture in visible/visual and/or infrared wavelength bands), and/or a hyperspectral imaging camera.

(B) An auxiliary blast support vehicle and/or auxiliary blast support equipment (e.g., which is carried by the auxiliary blast support vehicle) can include at least some elements, apparatuses, or devices that are generally analogous, analogous, essentially identical, or identical to those described above with respect to a blast support vehicle 100, e.g., depending upon a type of auxiliary blast support vehicle or auxiliary blast support equipment under consideration, in a manner readily understood by individuals having ordinary skill in the art in view of the description herein.

(C) In an embodiment, a wireless initiation device 1000 includes a housing or shell that carries a power source (e.g., a battery and/or a set of capacitors); power management circuitry; at least one control/processing unit providing transistor based circuitry configured for processing instructions/commands, and at least one memory for storing instructions/commands and data; possibly a sensing unit providing a set of sensors configured for sensing or generating signals corresponding to environmental conditions or parameters such as temperature, pressure, vibration, shock, the presence of certain chemical species, light, and/or other conditions or parameters (e.g., in-hole environmental conditions or parameters); an MI based communication unit providing modulation/encoding circuitry coupled to a set of MI signal sources (e.g., one or more coil antennas), and demodulation/decoding circuitry coupled to a set of magnetometers (which can include one or more magnetometers, such as one or more types of magnetometers indicated above, corresponding to one or more orthogonal spatial axes); and an initiation device (e.g., a detonator, or a DDT device), which is configurable or configured for selectively initiating and/or detonating an associated, supplemental, or main explosive charge (e.g., a booster explosive charge) that can be associated with, couplable/coupled to, or contained in the housing or shell.

(D) In an embodiment, a blast monitoring/tracking device 1600 includes a ruggedized or highly ruggedized housing that contains (i) a set of magnetic structures, elements, or devices having known magnetic properties detectable by blast support vehicles 100; and/or (ii) at least some of a power source; a control unit providing transistor based circuitry configured for processing instructions/commands, and at least one memory for storing instructions/commands and data; an MI based communication unit providing modulation/encoding circuitry coupled to a set of MI signal sources (e.g., one or more coil antennas), and demodulation/decoding circuitry coupled to a set of magnetometers (which can include one or more magnetometers, such as one or more types of magnetometers indicated above, corresponding to one or more orthogonal spatial axes); and a sensing unit providing a set of sensors configured for sensing or generating signals corresponding to environmental conditions or parameters such as temperature, pressure, vibration, shock, the presence of certain chemical species, light, and/or other conditions or parameters, e.g., in-hole environmental conditions or parameters.

In various embodiments, blast support vehicles 100 are configured for bidirectional MI based communication with wireless initiation devices 1000, and possibly bidirectional MI based communication with blast monitoring/tracking devices 1600. Auxiliary blast support vehicles and/or equipment can also be analogously configured for bidirectional MI based communication with wireless initiation devices 1000, and possibly bidirectional MI based communication with blast monitoring/tracking devices 1600, depending upon embodiment details and/or a commercial blasting operation under consideration.

Representative Implementations

The broadcast loop antenna can have an average loop diameter between 1 m and 100 m, or between 1 km and 10 km (e.g., surrounding a mine).

In one or more representative implementations, the broadcast MI signal frequencies can include substantially 2 kHz. The broadcast distance (from the broadcast MI signal source to the deployed blasting-related device) may be <1 skin depth, and in typical ground the broadcast MI signal frequencies may be less than 1.77 kHz, and assuming the broadcast MI signal source is about 100 m away to be safe from flyrock, and a suitable frequency range for broadcast MI signal frequencies can be from 100 Hz to 10 kHz. Alternatively or additionally, to allow the broadcast to be in the transition zone (with a broadcast distance greater than one skin depth), the broadcast MI signal frequencies may be from 100 Hz to 100 kHz.

The device-based magnetometers can include a coil or loop antenna (referred to as a "receive loop") with an average diameter of between 0.01 m and 0.3 m, which can corresponding to a diameter of the borehole. The device-based coil or loop antenna can have an average diameter of between 0.01 m and 0.3 m, which can corresponding to a diameter of the borehole The vehicle-based magnetometer can include a coil or loop antenna (referred to as a "receive loop") with an average diameter of between 0.01 m and 2 m; and the smaller loops may be coils on a ferrite core.

The uplink MI signal frequencies can include at least one frequency between 1000 Hz and 100 MHz, which might correspond to up to 10 skin depths (although some applications might require about 4 skin depths), or between 100 Hz to 100 MHz to include some nearfield/quasistatic transmission.

The frequencies for MI based position localization may include frequencies between 10 Hz and 10 MHz. The marker can include a receive loop with an average diameter from 0.01 m to 1 m; or a fluxgate magnetometer, SQUID magnetometer, AMR magnetometer, or Hall effect magnetometer.

The device-based antenna can be driven at a power level between 0.1 watts (W) and 100 W, e.g., substantially or approximately 3 W. The vehicle-based antenna can be driven at a power level between 1 W and 1000 W, e.g., substantially or approximately 50 (W).

Interpretation

The above description details certain aspects of commercial blasting systems, apparatuses, devices, techniques, and processes in accordance with particular non-limiting representative embodiments of the present disclosure. It will be readily understood by a person having ordinary skill in the relevant art that modifications can be made to one or more aspects of these and related embodiments without departing from the scope of the present disclosure.

Herein, reference to one or more embodiments, e.g., as various embodiments, many embodiments, several embodiments, multiple embodiments, some embodiments, certain embodiments, particular embodiments, specific embodiments, or a number of embodiments, need not or does not mean or imply all embodiments.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). Thus, a set includes at least one element. In general, an element of a set can include or be one or more portions of a system, an apparatus, a device, a structure, an object, a process, a procedure, physical parameter, or a value depending upon the type of set under consideration.

The FIGS. included herewith show aspects of non-limiting representative embodiments in accordance with the present disclosure, and particular structural elements shown in the FIGS. may not be shown to scale or precisely to scale relative to each other. The depiction of a given element or consideration or use of a particular element number in a particular FIG. or a reference thereto in corresponding descriptive material can encompass the same, an equivalent, an analogous, categorically analogous, or similar element or element number identified in another FIG. or descriptive material associated therewith. The presence of "/" in a FIG. or text herein is understood to mean "and/or" unless otherwise indicated. The recitation of a particular numerical value or value range herein is understood to include or be a recitation of an approximate numerical value or value range, for instance, within +/−20%, +/−15%, +/−10%, +/−5%, +/−2.5%, +/−2%, +/−1%, +/−0.5%, or +/−0%. The terms "substantially" and "essentially all" can indicate a percentage greater than or equal to 90%, for instance, 92.5%, 95%, 97.5%, 99%, or 100%.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavor to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A system for assisting blasting, the system including:
at least one wireless blasting-related device that is deployable or deployed proximate to or within a portion of physical media intended to be blasted as part of a commercial blasting operation, wherein the blasting-related device includes a device-based magnetic induction (MI) signal receiver with a magnetometer configured for through the earth (TTE) MI communication, and the blasting-related device includes a device-based MI signal source with a device-based antenna configured for TTE MI communication,
wherein the device-based MI signal source is configured to communicate with a vehicle-based MI signal receiver in a blast support vehicle that includes a set of vehicle-based magnetometers.

2. The system of claim 1, wherein the device-based MI signal source is configured to communicate with the vehicle-based MI signal receiver using transition region or zone signal MI communication such that the vehicle-based MI signal receiver can be positioned beyond the near-field region or zone of the magnetic field generated by the device-based MI signal source, optionally including within less than 10 skin depths, less than 8 skin depths, less than 5 skin depths, or less than 4 skin depths, away from the device-based MI signal source.

3. The system of claim 1, wherein the device-based MI signal source is configured to generate uplink MI signal frequencies including at least one frequency in the low frequency (LF) ITU frequency band, and/or frequencies between 100 Hz to 100 MHz, between 1 kHz and 100 MHz, between 10 kHz and 300 kHz, or between 20 kHz and 200 kHz, or between 35 kHz and 130 kHz, or between 50 kHz and 100 kHz.

4. The system of claim 1, wherein the device-based MI signal source includes a set of electrically conductive coil or loop antennas, which optionally have an average diameter of between 0.01 meters (m) and 0.3 m, optionally wherein the device-based MI signal source is aligned in the blasting-related device for generating a magnetic flux maximum parallel to the lengthwise, longitudinal, or central axis of the blasting-related device when deployed in a borehole; or wherein the device-based MI signal source is aligned in the blasting-related device for generating a magnetic flux maximum perpendicular to the lengthwise, longitudinal, or central axis of the blasting-related device when deployed in a borehole.

5. The system of claim 1, wherein the device-based magnetic induction (MI) signal receiver is configured to receive, decode and process downlink MI signals using one or more broadcast MI signal frequencies, which optionally include one or more frequencies within the ultra low frequency (ULF) band, or within the very low frequency (VLF) band as defined by the International Telecommunications Union (ITU), or between 100 Hz and 100 kHz, or between 100 Hz and 10 kHz, or substantially 2 kHz, wherein the blasting-related device includes one or more device-based magnetometers in the form of a 3-axis magnetometer or a single axis magnetometer, optionally wherein the device-based magnetometers include a coil or loop antenna with an average diameter of between 0.01 m and 0.3 m.

6. The system of claim 1, including the blast support vehicle, optionally wherein the vehicle-based MI signal receiver includes one or more vehicle-based magnetometers in the form of a 3-axis magnetometer or a single axis magnetometer, wherein the vehicle-based magnetometer includes a coil or loop antenna with an average diameter of between 0.01 m and 2 m,
wherein the blasting-related device can include:
one or more wireless initiation devices;
one or more wireless MI signal survey devices; and/or
one or more wireless blast monitoring-and-tracking markers,
optionally wherein the vehicle is configured for airborne or land based travel, including a remote-control unit for remote control of the vehicle, which includes an autonomous control unit for autonomous control of the vehicle,
wherein the blasting-related device includes one or more sensors that detect, monitor, estimate, or measure physical parameters associated with the physical media in which they are deployed,
wherein the blasting-related device includes a housing, shell, case, frame and/or support structure that mechanically houses, carries, protects and/or supports at least pressure and water-sensitive elements of the blasting-related device,
wherein the blasting-related devices are configured for establishing one or more ad-hoc MI-based communication networks among or between each other,
wherein the blast support vehicle is configured for through-the-air (TTA) wireless communication with a remotely located or distant blast control system, via TTA wireless communication with a communication hub, node, or hotspot associated with the remotely located blast control apparatus/system, wherein the blast support vehicle is configured to communicate with the blast control apparatus/system to verify whether the wireless initiation device(s) reside in correct or intended borehole(s) according to data from the blast control apparatus/system, or are non-responsive/dysfunctional or missing,
wherein the blast support vehicle is configured to preclude or prevent direct triggering of wireless initiation device arming and firing,
wherein the system includes a broadcast MI signal source, which includes a current driver providing MI signal modulation circuitry, and a broadcast loop antenna driven by the current driver, configured for generating or outputting broadcast MI communication signals having sufficient strength to be received by the wireless blasting-related devices,
wherein the system includes a set of auxiliary blast support vehicles in the form of wireless communication routing/repeater vehicles disposed between the blast support vehicle and a blast control apparatus/system, wherein the wireless communication routing/repeater vehicles are configured as through-the-air (TTA) wireless communication signal routers/repeaters,
wherein the markers are configured for generating or facilitating the generation of position or location signals that correspond to, indicate, or identify the marker's physical position or location before and/or after the commercial blasting operation, wherein the markers are configured to reside in boreholes in which the initiation devices reside, and/or in auxiliary boreholes located proximate to and separate from the boreholes in which the initiation devices reside, wherein each marker is assigned or programmed with its own unique ID, or a selected group of markers is assigned or programmed with a unique GID for that group,
wherein the vehicles carry imaging apparatuses or devices configured for capturing pre-blast, in-blast, and/or post-blast images and/or videos for aiding automated analysis of pre-blast, in-blast, and/or post-blast conditions.

7. The system of claim 6, wherein the wireless initiation devices are configured to be synchronized to a master clock unit corresponding to or carried by the blast support vehicle by way of the MI based communication between the blast support vehicle and the wireless initiation devices involved in the blast or blast sequence.

8. The system of claim 1, wherein the vehicle includes a vehicle-based MI signal source for sending downlink magnetic induction (MI) signals to the blasting-related device, wherein the vehicle-based MI signal source includes a coil or loop antenna optionally with an average diameter greater than a meter or multiple meters, or greater than multiple tens of meters; optionally wherein the vehicle-based MI signal source drives the vehicle-based antenna at one or more vehicle-based downlink MI signal frequencies, which can include at least one frequency in the low frequency (LF) ITU frequency band, and/or frequencies between 100 Hz to 100 MHz, between 1 kHz and 100 MHz, between 10 kHz and 300 kHz, or between 20 kHz and 200 kHz, or between 35 kHz and 130 kHz, or between 50 kHz and 100 kHz, optionally wherein the initiation devices are devices for giving rise to an explosion or detonation, and the downlink magnetic induction (MI) signals represent enabling 1 disabling, encoding, querying, (re)programming, (re)synchronizing, and/or controlling operation and/or firing of selected ones of the initiation devices, optionally wherein each initiation device can include a unique identifier (ID) stored in memory in the initiation device, and/or a group of the initiation devices includes a unique group ID (GID) stored in the memory.

9. The system of claim 1, wherein the system includes at least one MI noise monitoring unit including a set of noise-detection magnetometers configured for detecting, measuring, or monitoring background magnetic field noise in one or more frequency bands in a commercial blasting environment, optionally including a through-the-air (TTA) wireless communication unit and/or an MI based communication unit, optionally wherein the MI noise monitoring unit is separate from the blast support vehicle, and is carried by a background noise measurement vehicle or is supported by or mounted on a frame or housing that remains stationary at a predetermined position proximate to or within the portion of the physical media intended to be blasted.

10. The system of claim 1, wherein the system includes a survey device configured for measuring or monitoring MI signal strength proximate to or within the portion of the physical media at one or more MI signal frequencies, e.g., between 10 Hz and 10 MHz, optionally wherein the system includes an extendable apparatus that is extendable into and selectively/selectably positionable along the depth or length of the borehole, wherein the extendable apparatus carries the survey device at a predetermined position along the extendable apparatus, optionally wherein the blast support vehicle is in the form of a borehole drill rig that includes the survey device, and the borehole drill rig include a first MI based communication unit of the survey device deployable in a borehole by the shaft, and a second MI based communication unit deployed or deployable above the shaft.

11. The system of claim 1, wherein the blast support vehicle carries one or more MI communication orientation adjustment units by which a spatial orientation of the vehicle-based MI signal source (including the antenna) and/or the set of vehicle-based magnetometers can be adjusted in 1, 2 or 3 mutual orthogonal angular directions to enhance or maximize MI communication signal strength between the blast support vehicle and the wireless blasting-related device(s) disposed or deployed in each borehole.

12. The system of claim 1, wherein the MI based communication unit can include a vehicle-based frequency tuner for frequency band or frequency tuning of the vehicle-based MI signal receiver and/or the vehicle-based MI signal source.

13. A method for assisting blasting, the method including:
communicating to at least one wireless blasting-related device using downlink MI communication that is through the earth (TTE), wherein the blasting-related device is deployed proximate to or within a portion of physical media intended to be blasted as part of a commercial blasting operation; and
receiving communications from the blasting-related device to a vehicle-based MI signal receiver using uplink MI communication that is TTE.

14. The method of claim 13, including the vehicle-based MI signal receiver using transition region or zone signal MI communication such that the vehicle-based MI signal receiver can be positioned beyond the near-field region or zone of a magnetic field generated by a device-based MI signal source, optionally including within less than 10 skin depths, less than 8 skin depths, less than 5 skin depths, or less than 4 skin depths, away from the device-based MI signal source, including generating uplink MI signal frequencies including at least one frequency in the low frequency (LF) ITU frequency band, and/or frequencies between 100 Hz to 100 MHz, between 1 kHz and 100 MHz, between 10 kHz and 300 kHz, or between 20 kHz and 200 kHz, or between 35 kHz and 130 kHz, or between 50 kHz and 100 kHz.

15. The method of claim 13, wherein downlink MI communication includes one or more frequencies within the ultra low frequency (ULF) band, or within the very low frequency (VLF) band as defined by the International Telecommunications Union (ITU), or between 100 Hz and 100 kHz, or between 100 Hz and 10 kHz, or substantially 2 kHz.

* * * * *